United States Patent [19]
Karrai

[11] Patent Number: 5,912,527
[45] Date of Patent: Jun. 15, 1999

[54] INERTIAL POSITIONER

[75] Inventor: Khaled Karrai, Munich, Germany

[73] Assignee: Dr. Khaled Karrai Und Dr. Miles Haines Gesellschaft Burgerlichen Rechts, Munich, Germany

[21] Appl. No.: 08/901,848

[22] Filed: Jul. 28, 1997

Related U.S. Application Data

[60] Provisional application No. 60/024,024, Aug. 16, 1996.

[30] Foreign Application Priority Data

Aug. 5, 1996 [GB] United Kingdom .................... 9616456
Mar. 14, 1997 [GB] United Kingdom .................... 9705374

[51] Int. Cl.$^6$ ............................... H02N 2/00; H01L 41/08
[52] U.S. Cl. ............................................. 310/328
[58] Field of Search ............................................. 310/328

[56] References Cited

U.S. PATENT DOCUMENTS

| | | | |
|---|---|---|---|
| 3,902,084 | 8/1975 | May, Jr. .................................. | 310/328 |
| 4,163,168 | 7/1979 | Ishikawa et al. ....................... | 310/328 |
| 4,195,243 | 3/1980 | Thaxter .................................. | 310/317 |
| 4,219,755 | 8/1980 | O'Neill .................................. | 310/328 |
| 4,874,979 | 10/1989 | Rapp ..................................... | 310/328 |
| 4,890,027 | 12/1989 | Bohner et al. ......................... | 310/328 |
| 4,894,579 | 1/1990 | Higuchi et al. ........................ | 310/328 |
| 4,968,914 | 11/1990 | West et al. ............................. | 310/328 |
| 5,095,725 | 3/1992 | Wada et al. ............................ | 310/328 |
| 5,205,147 | 4/1993 | Wada et al. ............................ | 310/328 |
| 5,260,622 | 11/1993 | West ....................................... | 310/328 |
| 5,589,723 | 12/1996 | Yoshida et al. ........................ | 310/328 |
| 5,786,654 | 7/1998 | Yoshida et al. ........................ | 310/328 |

FOREIGN PATENT DOCUMENTS

| | | | |
|---|---|---|---|
| 0 464 764 A1 | 1/1992 | European Pat. Off. ........ | G05B 19/40 |
| 0 747 977 A1 | 12/1996 | European Pat. Off. ........ | H01L 41/09 |
| 63-262065 | 10/1988 | Japan ..................................... | 310/328 |

OTHER PUBLICATIONS

Anders, M., et al., "Simple Micropositioning Devices for STM," *Surface Science*, Elsevier Science Publishers B.V., vol. 181, pp. 176–182 (1987).

Lyding, J.W., et al., "Variable–Temperature Scanning Tunneling Microscope," *Review of Scientific Instruments*, American Institute of Physics, vol. 59, No. 9, pp. 1897–1902 (Sep. 1988).

Niedermann, Ph., et al., "Simple Piezoelectric Translation Device," *Review of Scientific Instruments*, American Institute of Physics, vol. 59, No. 2, pp. 368–369 (Feb. 1988).

Pohl, D.W., "Dynamic Piezoelectric Translation Devices," *Review of Scientific Instruments*, American Institute of Physics, vol. 58, No. 1, pp. 54–57 (Jan. 1987).

Renner, Ch., et al., "A Vertical Piezoelectric Inertial Slider," *Review of Scientific Instruments*, American Institute of Physics, vol. 61, No. 3, pp. 965–967 (Mar. 1990).

Wildöer, J.W.G., et al., "Low–Temperature Scanning Tunneling Microscope for Use on Artificially Fabricated Nanostructures," *Review of Scientific Instruments*, American Institute of Physics, vol. 65, No. 9, pp. 2849–2852 (Sep. 1994).

*Primary Examiner*—Thomas M. Dougherty
*Attorney, Agent, or Firm*—Watts, Hoffmann, Fisher & Heinke, Co., L.P.A.

[57] ABSTRACT

An inertial positioner comprising a base plate and a carriage plate (2) slidably connected to one another via a bearing assembly (3) so as to allow relative movement of the plates in a positioning direction. The bearing assembly (3) comprises two sets of caged ball bearings seated in respective pairs of V-grooves (25 and 26) formed in the facing surfaces of the base and carriage plates, the V-groove pairs extending spaced apart in the positioning direction. An actuator comprising a piezoelectric element (4) and a rod (5) extends between the plates (1 and 2), the piezoelectric element (4) being secured to the carriage plate (2) and the rod (5) forming a frictional engagement characterized by a force F with the base plate via a collar (20) fastened to the base plate via biasing means (not shown). In operation, a periodic saw-tooth voltage is applied to the piezoelectric element (4) to produce motion.

14 Claims, 24 Drawing Sheets

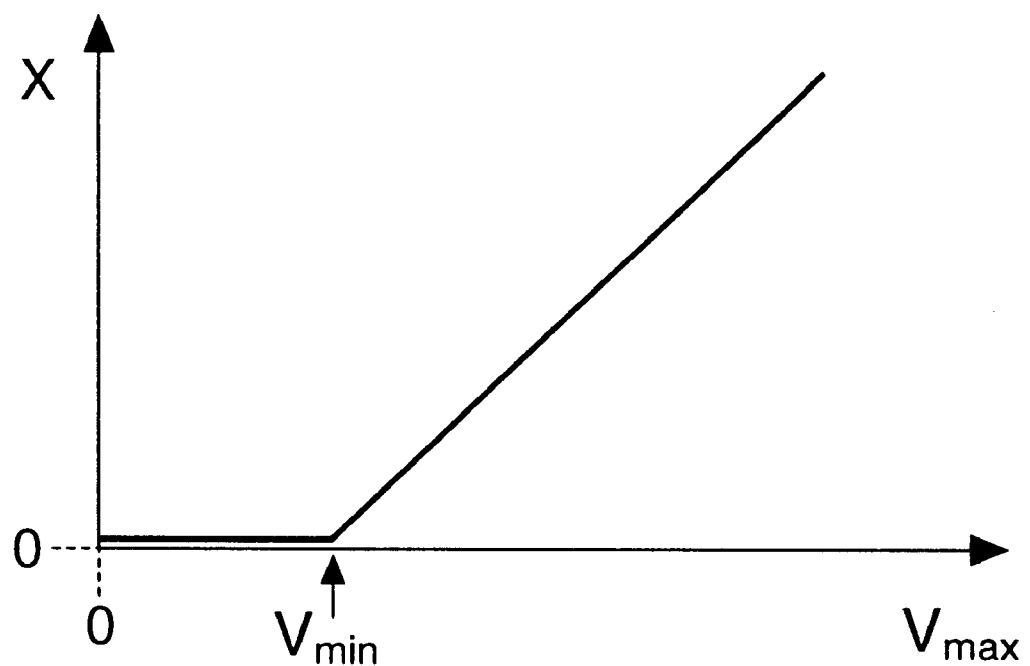

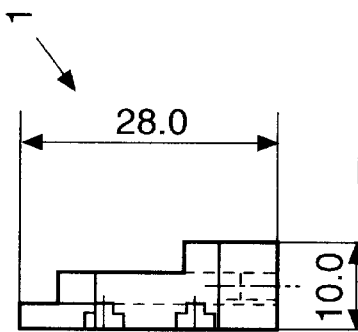
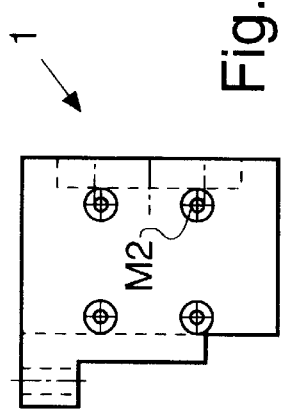
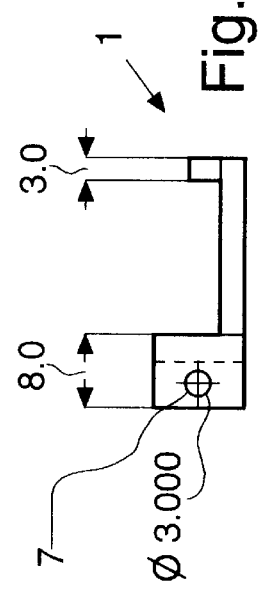
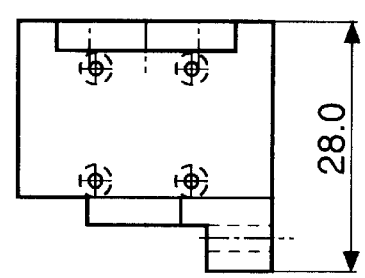
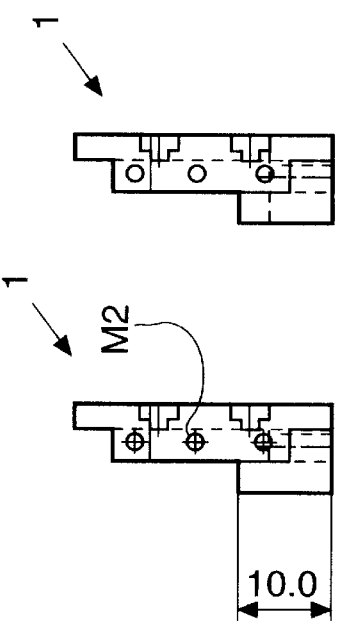
Fig. 10, Fig. 10A, Fig. 10B, Fig. 10C, Fig. 10D, Fig. 10E, Fig. 10F Fig. 11
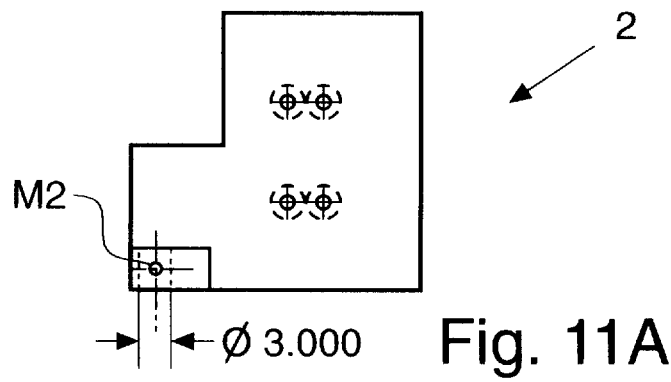
Fig. 11A
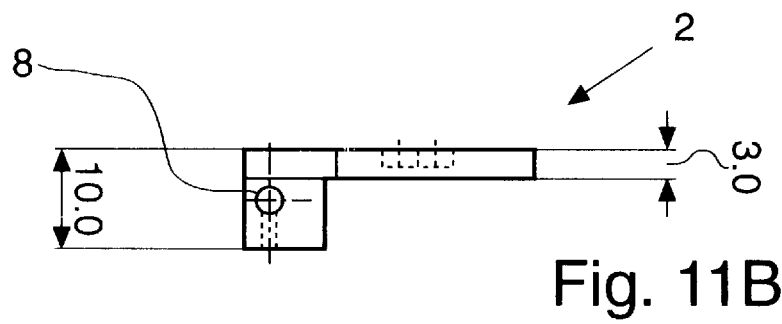
Fig. 11B
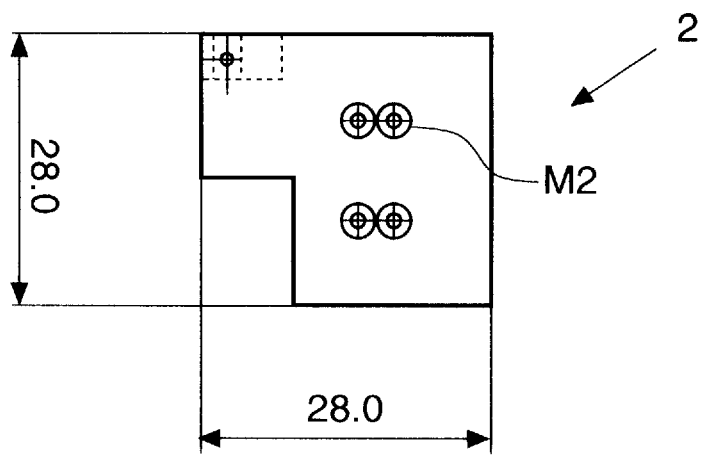
Fig. 11C

INERTIAL POSITIONER

This application claims benefit of Provisional Application No. 60/024,024 filed Aug. 16, 1996.

BACKGROUND OF THE INVENTION

1. Field of the Invention

The invention relates to positioners operating by the principle of inertial motion.

2. Art Background

Positioners are in widespread use in many industrial and scientific applications. Applications which require the use of positioners include scanning probe microscopy, optical microscopy, Fourier transform spectrometry and semiconductor wafer handling.

One known type of positioner comprises a movable jockey comprising an extensible element connected at both ends to clamping elements which can be selectively actuated to clamp to and release from a reference rail or the like. In such positioners, motion is produced by clamping the first end, releasing the second end, extending the extensible element, clamping the second end, releasing the clamp at the first end, contracting the extensible element, clamping the first end, releasing the second end and so forth, thus generating motion in a wormlike fashion. Such positioners are known for example from U.S. Pat. No. 3,902,084, U.S. Pat. No. 4,874,979, U.S. Pat. No. 4,968,914 and U.S. Pat. No. 5,260,622.

Another type of positioner, this being the type of positioner to which the present invention relates, comprises two elements in frictional engagement with one another which slide relative to one another when the frictional force between them is overcome. Motion is generated by the interplay between inertia of one of the elements and slipping or sticking of the frictional engagement between the elements. Positioners of this kind are referred to as inertial positioners or slip-stick positioners and are known for example from an article by Dieter Pohl in the journal "Review of Scientific Instruments" in volume 58, pages 54 to 57 (1986) and further articles in the same journal in volume 59, pages 368 to 369 (1988) by Niedermann et al, volume 59, pages 1897 to 1902 (1988) by Lyding et al and volume 65, pages 2849 to 2852 (1994) by Wildöer et al, as well as from an article in the journal "Surface Science" by Anders et al in volume 181, pages 176 to 182 (1987).

Inertial slip-stick positioners can be made with only a few major components and can be driven with a single electrical signal, such as a sawtooth waveform. However, known inertial slip-stick positioners have a low load bearing capacity and a high degree of sensitivity to orientation, unlike the above-described worm positioners.

SUMMARY OF THE INVENTION

According to a first aspect of the invention there is provided an inertial positioner comprising a base and a carriage connected to one another so as to allow inertial motion of the carriage relative to the base in a positioning direction, there being an actuator for impelling the carriage in the positioning direction, the actuator comprising an electrically extensible piezoelectric element and a rod connected in series therewith, the actuator extending between the carriage and the base with the piezoelectric element secured to one of the carriage and the base and the rod forming a frictional engagement with the other of the carriage and base, such that extension of the piezoelectric element either causes movement of the carriage in the positioning direction, with the frictional engagement sticking, or slippage of the rod in its frictional engagement, with the carriage remaining still relative to the base.

According to a second aspect of the invention there is provided an inertial positioner, comprising: a base plate having an upper surface, a lower surface and at least one external side surface interconnecting the upper and lower surfaces; a top plate having an upper surface, a lower surface and at least one external side surface interconnecting the upper and lower surfaces of the top plate; a bearing assembly arranged sandwiched between the base plate and the top plate to slidably connect the upper surface of the base plate to the lower surface of the carriage plate so as to allow motion of the top plate in a positioning direction; a piezoelectric element having a principal axis extending substantially parallel to the positioning direction, and first and second end faces extending in respective planes substantially perpendicular to said principal axis, said first end face of the piezoelectric element being rigidly secured to a portion of said at least one external side surface of the carriage plate; a rod having a principal axis extending substantially parallel to the positioning direction, first and second end faces extending in respective planes substantially perpendicular to said principal axis, and an upper and a lower side surface portion extending substantially parallel to said principal axis of the rod, said first end face of the rod being rigidly secured to said second end face of the piezoelectric element and said lower side surface portion of the rod lying on a surface portion of the upper surface of the base plate; and a pressing member arranged above and secured to the base plate and having a lower surface portion arranged pressed against said upper side surface portion of the rod to define a frictional force for movement of the rod along the principal axis of the rod in between the pressing member and the base plate.

Bearings provide for smooth, low-friction and accurate tracking in the positioning direction and also take up loads in a reliable, well-specified manner. However, as an alternative to bearings, simple rails could be used instead. If a bearing assembly is provided, it may comprise two bearing units. Further, if the two bearing units are arranged spaced apart and extending along a pair of opposing sides of a plate-shaped carriage and base, space is made available in between the bearing units which may accomodate the actuator, e.g. extending along an axis between the two bearing units, or provide space for a through hole through the positioner.

To provide such a through hole in an inertial positioner according to the second aspect of the invention, the base plate may have an internal side surface interconnecting the upper surface and the lower surface of the base plate and extending to define a hole through the base plate, and the carriage plate having an internal side surface interconnecting the upper surface and the lower surface of the base plate and extending to define a hole through the carriage plate, the respective internal side surfaces being arranged so as to provide for access through the positioner.

According to a third aspect of the invention there is provided an inertial positioner, comprising: a rod arranged upstanding in the positioner and having a principal axis, upper and lower end faces extending in respective planes substantially perpendicular to said principal axis, and a first and a second side surface portion extending substantially parallel to said principal axis; a base member arranged to contact said first side surface portion of the rod; a pressing member arranged to contact said second side surface portion of the rod and to press against said second side surface portion of the rod to define a frictional force between the pressing member and the base member; a piezoelectric element arranged upstanding in the positioner and having a principal axis, and upper and lower end faces extending in respective planes substantially perpendicular to said principal axis of the piezoelectric element, said lower end face of the piezoelectric element being rigidly secured to the upper end face of the rod; and a carriage member having a mass and a lower surface portion, the lower surface portion being rigidly secured to the upper end face of the piezoelectric element so that said mass acts on the rod via the piezoelectric element.

A positioner according to the second aspect of the invention may be placed on a further positioner according to the second aspect such that their positioning directions are mutually perpendicular to thus provide an xy-positioner. Moreover, a positioner according to the third aspect of the invention may be placed on such an xy-positioner to form an xyz-positioner.

The frictional engagement between the rod and said one of the carriage and base is preferably formed by engagement over an area of contact between a surface portion of the rod and a correspondingly shaped surface portion of the said one of the carriage and base, slippage of the rod being guided in a slippage direction defined by the surface portions. For linear positioners, it is generally most efficient to arrange the slippage direction to be in line with the positioning direction. The rod shapes which are amongst the most convenient to manufacture are cylindrical (e.g. circular cross-section) or parallelepiped (e.g. square or rectangular cross-section). Circular cross-section rods can be used in conjunction with corresponding circular bores, arcuate grooves or V-grooves in the carriage or base to form the frictional engagement. Square, rectangular or semicircular cross-section rods can be used in conjuntion with corresponding V-grooves or slots in the carriage or base. Square or rectangular cross-section rods have the advantage that they provide for flat, i.e. planar, areas of contact with the receiving portions of the carriage or base so that wear in the mutually contacting areas forming the frictional engagement will not change the force characteristic of the frictional engagement. The frictional engagement is characterised by a frictional force which may be greater than or equal to at least one of the group: 1, 5, 10 and 20 newtons, depending on the load capacity required. There is preferably provided an adjuster for adjusting the frictional force applied to the rod.

The carriage, base and most especially the actuator are preferably made as stiff as possible. Stainless steel is stiff, having a Young's modulus of $20 \times 10^{10}$ N/m$^2$, and is moreover easy to machine, inexpensive, non-corrosive and only weakly magnetic. It is thus the preferred material for the carriage and the base and also a preferred material for the rod. Tungsten, which has an even greater Young's modulus of $39 \times 10^{10}$ N/m$^2$, is a preferred alternative material for the rod, the stiffness of which is critical to performance of the positioner. However, tungsten is relatively expensive and also difficult to machine so that its use is probably not commercially worthwhile for carriage and base, unless performance considerations outweigh cost considerations. Other metals of Young's modulus approximately equal to or greater than that of stainless steel could also provide comparable performance. Performance adequate for some applications is however achievable with rods made of a material of lower Young's modulus, such as titanium, brass or quartz.

The piezoelectric element can be of the stack or tube type. A stack is however generally preferred, since it can be made stiffer than a tube for the same outside dimensions. If a stack is used, it preferably has a cross-sectional area of greater than at least one of the group: 10, 20, 30, 50 and 75 square millimeters. If a tube is used, it preferably has an outside diameter greater than or equal to at least one of the group: 4, 6, 8 and 10 millimeters.

The overall stiffness of the actuator, taking into account the stiffness of the rod and piezoelectric element in the direction of slippage, is preferably greater than 0.05 newtons per nanometer, most preferably greater than at least one of 0.1, 0.2, 0.5 and 1.0 newtons per nanometer. To achieve maximum stiffness of the actuator it is preferred that the piezoelectric material of which the piezoelectric element is made has a Young's modulus of greater than $7 \times 10^{10}$ newtons per square meter and/or that the material of which the rod is made has a Young's modulus of greater than at least one of the group 10, 18 and $35 \times 10^{10}$ newtons per square meter, e.g. is made of titanium, iron, steel, stainless steel or tungsten. The piezoelectric element preferably has in the direction of slippage a stiffness of greater than at least one of the group: 0.1, 0.2, 0.5 and 1.0 newtons per nanometer. The rod pereferably has in the direction of slippage a stiffness of greater than at least one of the group: 0.2, 0.5, 1.0 and 2.0 newtons per nanometer.

A preferred application for a positioner embodying the invention is as as a so-called coarse positioner for a scanning probe microscope, such as a scanning tunnelling microscope or an atomic force microscope. General positioning applications are however considered to be at least as important.

Another preferred application is as a positioner in a conventional optical microscope, for example for positioning a microscope slide. For such an application an embodiment is provided having a bearing assembly comprising two bearing units arranged spaced apart and extending along a pair of opposing sides of a plate-shaped carriage and base, the actuator is arranged to extend along an axis extending between the two bearing units and the carriage and base plates have apertures therein to form a through hole extending through the positioner between the bearing units to allow back lighting, transmission microscopy, access by an objective lens and other capabilities desirable for a microscope slide positioner.

BRIEF DESCRIPTION OF THE DRAWINGS

FIG. 7 Graph showing step size x plotted against peak voltage $V_{max}$ of the drive signal for a piezoelectric element of non-zero compliance, i.e. finite stiffness.

FIGS. 10A, 10B, 10C, 10D, 10E, and 10F Technical drawing in first-angle projection of a lower plate (base element) of a positioner according to a second embodiment of the invention.

FIGS. 11A, 11B, and 11C Technical drawing in first-angle projection of an upper plate (carriage element) of a positioner according to the second embodiment of the invention.

DETAILED DESCRIPTION

Figure 1A:
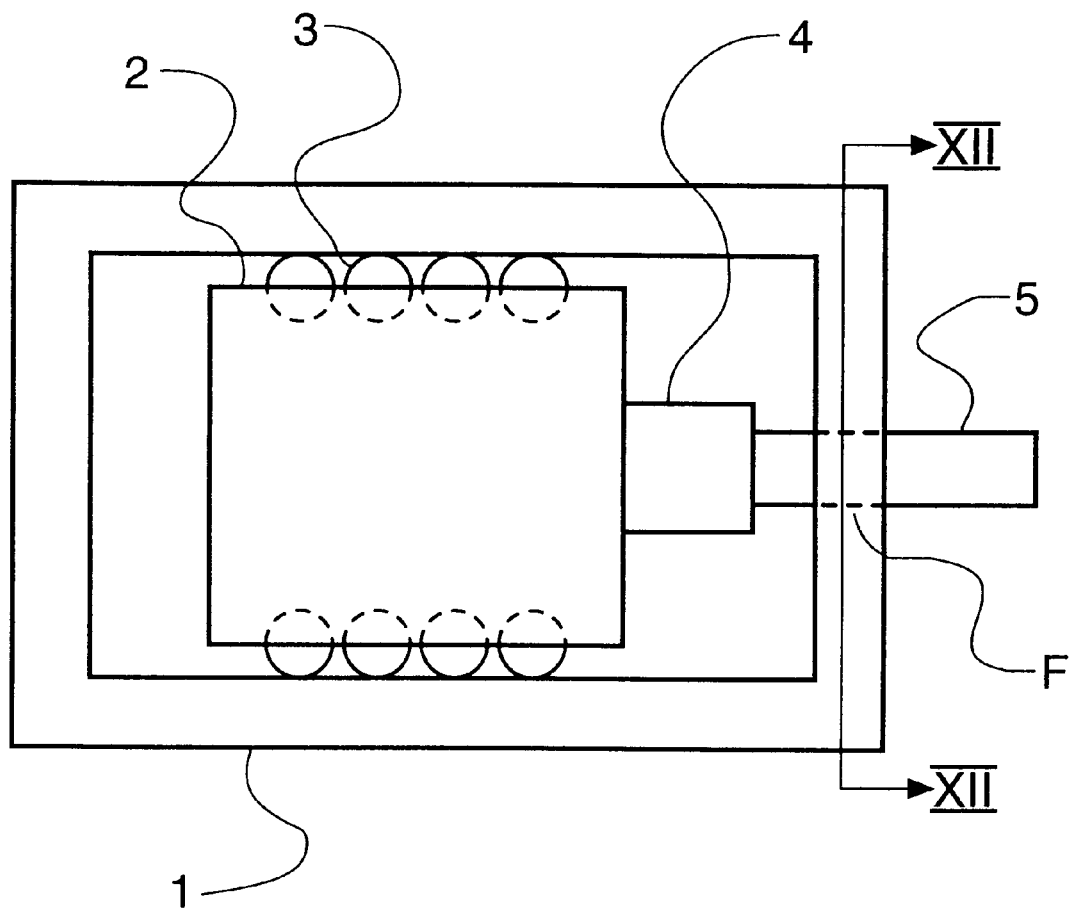
FIG. 1A A schematic representation of a positioner according to a first embodiment of the invention.

FIG. 1A shows schematically a positioner comprising a base element 1 which is to be fixed, for example to an optical table, instrument housing etc., and a carriage element 2 on which an object to be moved can be mounted or against which a load to be acted upon can be applied. Carriage element 2 is slidably mounted in base element 1 via bearings 3 which provide tracking in the direction of movement (left-to-right or right-to-left in FIG. 1A). Carriage 2 is fixed to one end face of a piezoelectric element 4 which is extensible in the direction of movement. The other side of the piezoelectric element 4 is fixed to one end face of a rod 5 which extends through an aperture in the base element 1, the aperture and rod 5 experiencing a relative frictional force of magnitude F in the direction of movement.

To move the carriage leftwards in FIG. 1A, a sawtooth voltage signal having a slow rising edge and a rapidly decaying falling edge is applied to the piezoelectric element 4. During the slow rising part of the signal, the rod 5 remains stuck to the aperture of the base element 1 while the length of the piezoelectric element 4 slowly increases, thus pushing the carriage to the left in FIG. 1A. During the fast decaying part of the signal, the length of the piezoelectric element 4 rapidly decreases and, due to the inertia of the carriage (including any external load thereon), causes the rod 5 to slip in the aperture while the carriage 2 remains static.

To move the carriage rightwards in FIG. 1A, an inverted sawtooth voltage signal is applied to the piezoelectric element 4. During the slow falling part of the signal, the rod 5 remains stuck to the aperture of the base element 1 while the piezoelectric element 4 slowly contracts, thus pulling the carriage 2 to the right in FIG. 1A. During the fast rising part of the signal, the piezoelectric element 4 rapidly expands and, due to the inertia of the carriage (including any external load thereon), causes the rod 5 to slip in the aperture while the carriage 2 remains static.

Movement in both directions is thus achieved.

Independent of the direction of motion required, the sawtooth drive signal is thus subdivided into two phases, one which is intended to produce slippage between rod and base element whilst the carriage remains still (slip phase) and one which is intended to move the carriage whilst the rod and base element remain stuck together (stick phase).

Figure 1B:
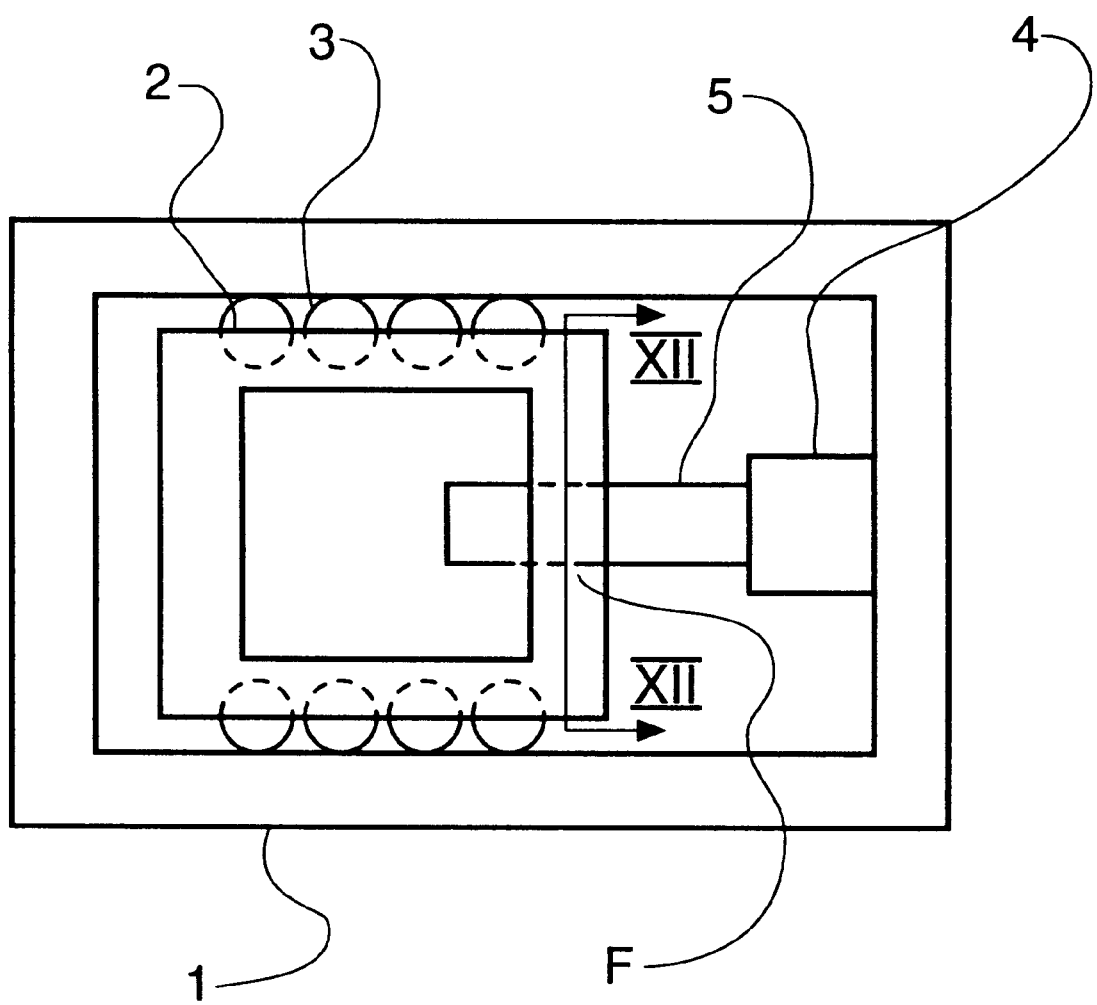
FIG. 1B A schematic representation of a positioner according to an equivalent to the first embodiment of the invention.

FIG. 1B shows an equivalent arrangement to that of FIG. 1A, but with the piezoelectric element 4 secured to the base element 1 and the rod 5 extending through an aperture in the carriage 2 so that the frictional engagement F is between rod and carriage, rather than rod and base element as in FIG. 1A.

Figure 2A:
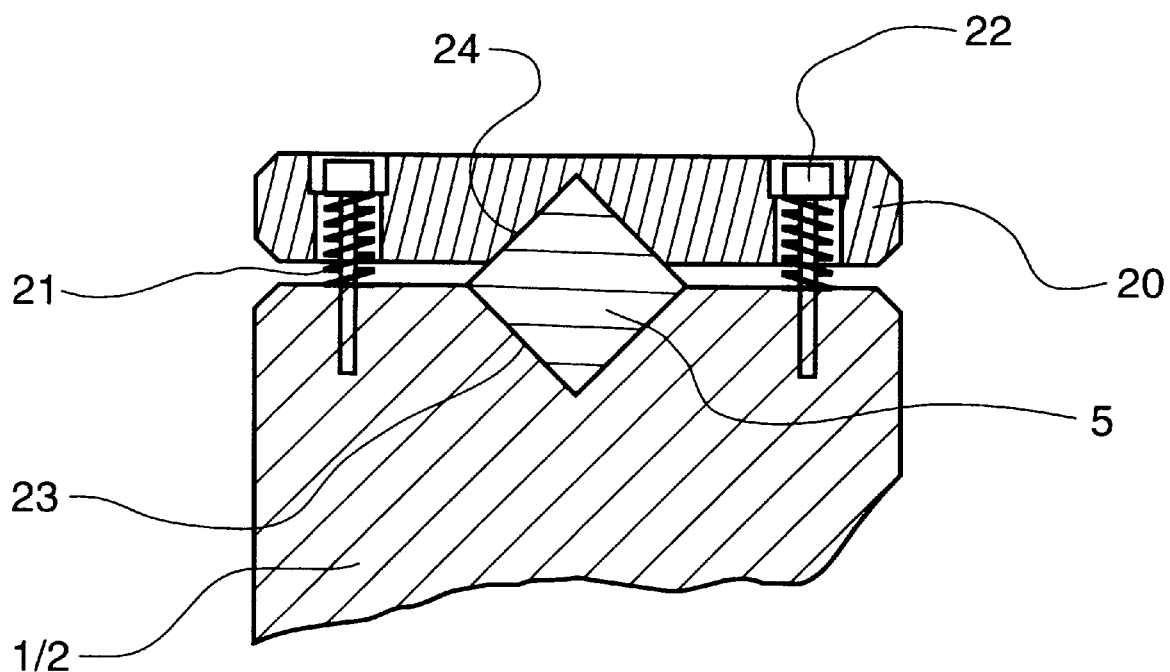
FIG. 2A Cross-section through plane XII of FIG. 1A or 1B showing schematically an arrangement for providing frictional engagement between carriage and base by means of a rod of square-section seated in a pair of facing V-grooves.
Figure 2B:
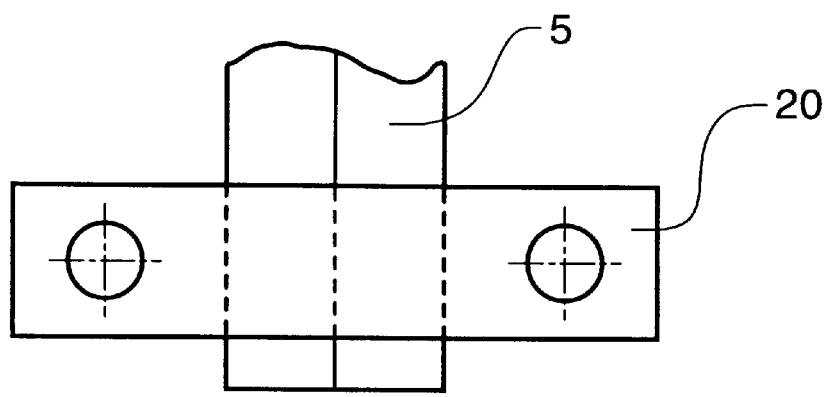
FIG. 2B Plan view of the arrangement of FIG. 2A.

FIG. 2A shows schematically a section through the plane XII of FIG. 1A or FIG. 1B according to one design of the region of frictional engagement and FIG. 2B shows the arrangement of FIG. 2A in plan view. Rod 5 is of square section and is slidably seated in a V-groove 23 machined in the base element (FIG. 1A) or carriage element (FIG. 1B) and a further V-groove 24, which faces the first-mentioned V-groove, machined in a collar 20. Collar 20 biases rod 5 in the V-groove 24 in the base/carriage element by means of a pair of screws 22 each biased by a respective spring 21 arranged in extension coaxially and concentrically around the screw concerned. The biasing force applied, and thus the magnitude of the frictional force F, can be ajusted via adjustment of the screws 22. Typical frictional forces F vary between ½ to 10 newtons, although values outside this range could also be set if desired. Generally a higher frictional force value F will provide a greater load capapability of the positioner but increase the tendecy to wear. A calibrated force guage can be used to measure the force required to make rod 5 slide, i.e. overcome static friction, and thus the screws 22 can be adjusted to produce a desired value of the frictional force F. Instead of a V-groove, the rod could for example seat in a slotted groove in the base/carriage element, with the flat base of the slotted groove being in contact with a corresponding flat surface of a rod of square, rectangular, triangular or semicircular cross-section.

Figure 3:
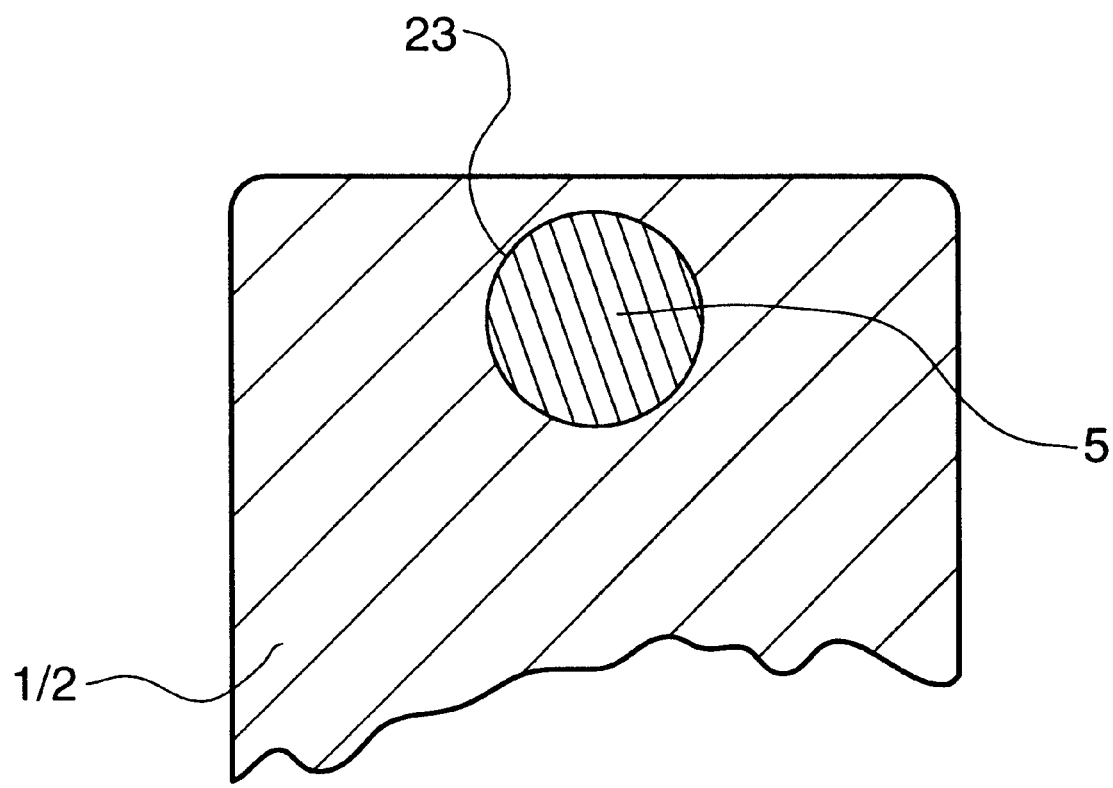
FIG. 3 Cross-section through plane XII of FIG. 1A or 1B showing schematically an arrangement for providing frictional engagement between carriage and base by means of a rod of circular section.

FIG. 3 shows schematically a section through the plane XII of FIG. 1A or FIG. 1B according to an alternative design of the region of frictional engagement. Rod 5 is of circular section and is slidably arranged in a precision machined bore in the base element (FIG. 1A) or carriage element (FIG. 1B), thus forming an arrangement in the manner of a piston and sleeve.

Figure 4A:
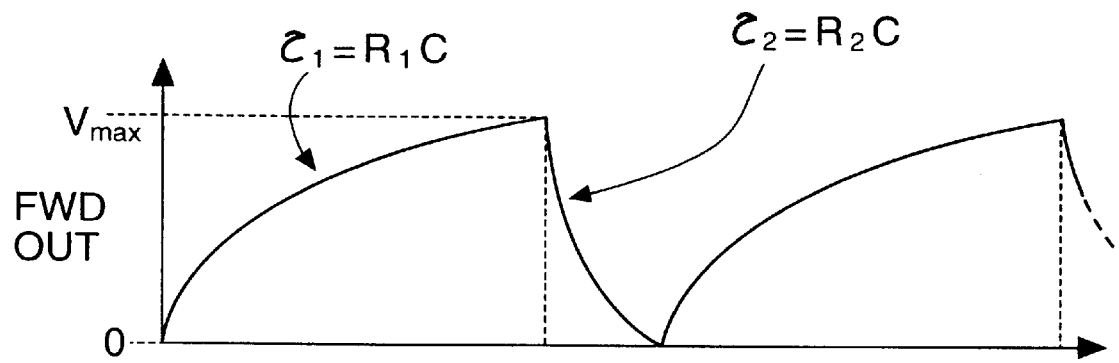
FIG. 4A Graph showing a first exemplary drive signal, having positive and negative exponential portions, suitable for driving a positioner according to embodiments of the invention.
Figure 4B:
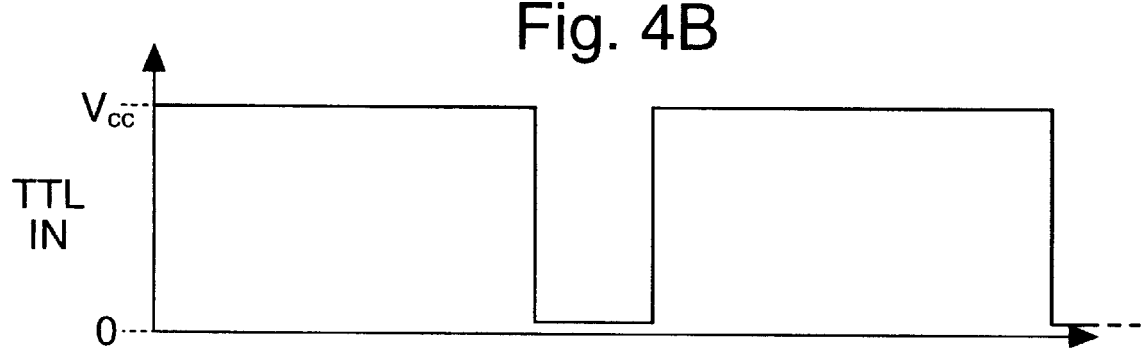
FIG. 4B Graph showing a TTL signal which can be used to generate a drive signals according to FIG. 4A.
Figure 4C:
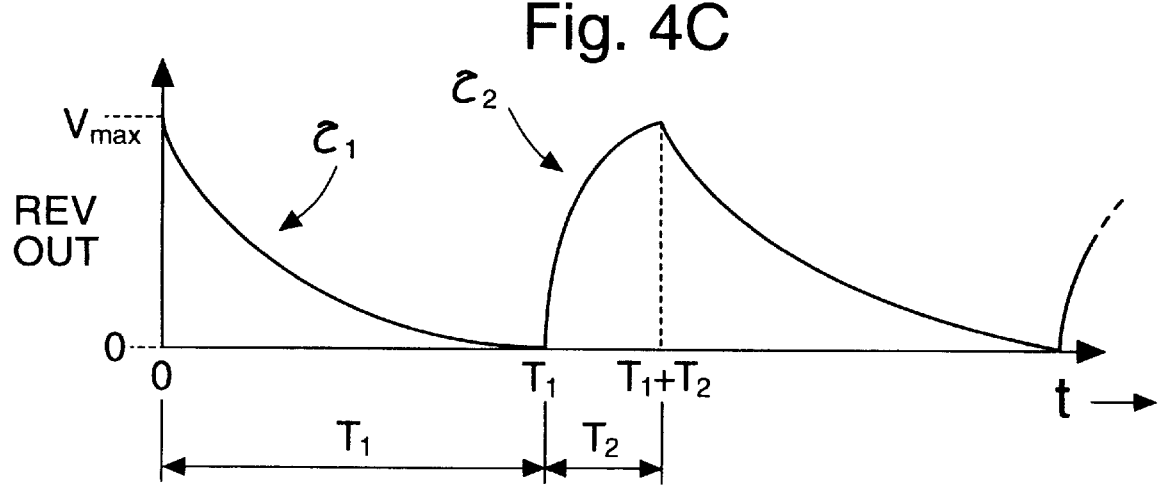
FIG. 4C Graph showing an inverted form of the first exemplary drive signal for driving a positioner in the opposite direction from the drive signal of FIG. 4A the inverted form also being generatable with the TTL signal of FIG. 4B.

FIGS. 4A to 4C show details of a first exemplary drive signal, the effect of which on the positioner is explained with reference to FIG. 1A.

The waveform shown in FIG. 4A will generate motion of the carriage 2 from left to right in FIG. 1A, whereas the inverted waveform shown in FIG. 4C will generate motion from right to left in FIG. 1A. FIG. 4B shows a TTL signal which can be input into the drive circuit shown in FIG. 5 for generating the waveforms according to either FIG. 4A or 4C.

Figure 5:
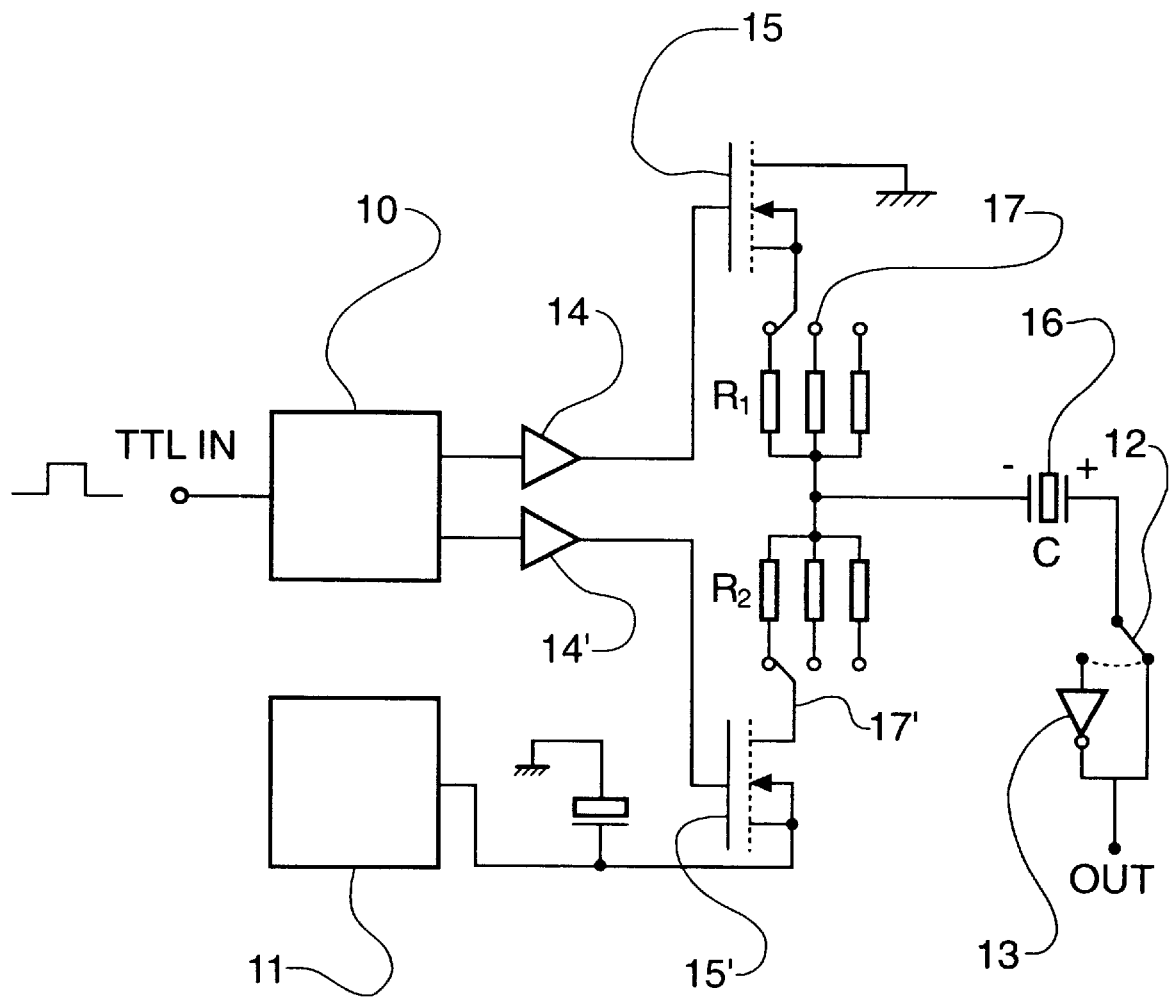
FIG. 5 Drive circuit for converting the TTL signal shown in FIG. 4B selectively into either the drive signal shown in FIG. 4A or the inverted form of the drive signal shown in FIG. 4C.

A drive signal according to FIG. 4A or 4C is of especial practical interest since it can be generated by a simple circuit, for example that of FIG. 5, by periodically charging one capacitor and discharging another in an RC network. FIG. 5 is described in more detail further below.

The drive signal shown in FIGS. 4A or 4C is a voltage signal and has a generally sawtooth form. Each sawtooth has an exponentially rising portion, rising over a time $T_1$ from zero voltage to a peak value $V_{max}$ with a rise rate characterised by a value $\tau_1$ and a decaying portion falling exponentially from the above-mentioned peak voltage value to zero over a time $T_2$ at a decay rate characterised by a value $\tau_2$.

The negative exponential portion of the drive signal of time constant $\tau_2$ is now considered.

If the frictional force F had an infinite value, then the length l of the piezoelectric element 4 would change at an exponential rate as the drive signal dropped in voltage from its peak value to zero voltage, i.e. $x=x_{max}\exp(-t/\tau_2)$, where x is the direction of movement and $x_{max}$ is the expansion of the piezoelectric element in response to a voltage change from zero to $V_{max}$ applied thereto. The carriage of mass M would thus be accelerated by the piezoelectric element at a rate given by the double differential of x with respect to time, i.e. $a=d^2x/dt^2=(x_{max}/\tau_2^2)\exp(-t/\tau_2)$. From Newton's law, the force $F_M$ acting on the carriage would be given by its mass times the acceleration, i.e $F_M=(Mx_{max}/\tau_2^2)\exp(-t/\tau_2)=F_o\exp(-t/\tau_2)$ where $F_o=Mx_{max}/\tau_2^2$.

The relationship between $F_M$, which for the first exemplary drive signal varies with time during a signal period, and the frictional force F between rod and base element is critical for performance of the positioner.

The relative values of F and $F_M$ can be visualised with reference to FIG. 1A or FIG. 1B as representing the competition between, on the one hand, the piezoelectric element 4 pushing or pulling the carriage 2 against the carriage's own inertia and, on the other hand, pushing or pulling the rod 5 overcoming the frictional force F as the piezoelectric element 4 expands or contracts respectively.

In reality, the frictional force F must of course be finite and this is now considered. With the drive signal shown in FIG. 4A or 4C, the rod will only slip for that part of the negative exponential portion of the signal for which the condition $F<F_M$ is met, remembering that for such a drive signal $F_M$ is a temporally varying quantity.

The condition $F<F_M$ during the negative exponential phase of the drive signal is thus given by $F<(Mx_{max}/\tau_2^2)\exp(-t/\tau_2)$ and can also be expressed as $\tau_2<\sqrt{(Mx_{max}/F_o)}$.

The exponential decay of the voltage from the peak value to zero will thus initially be in a regime where $F<F_M$ (i.e. slip) until a voltage is reached at which $F=F_M$ after which $F>F_M$ (i.e. stick) and the carriage of mass M will be moved in the opposite direction to that of the intended net motion over a whole period. A positioner which is to be operated with a negative exponential portion of this kind to produce the slip part of the slip-stick cycle thus needs to be designed such that the unwanted recoil portion of the cycle which occurs at $F>F_M$ is as small as possible. This is ensured by designing the positioner such that $\tau_2<<\sqrt{(Mx_{max}/F_o)}$. Generally the larger the value of $F_o$ in relation to F, the smaller will be the recoil distance $x_{recoil}$ in comparison to the total extension of the piezoelectric element $x_{max}$. For example, if $F_o/F=10$ then it is calculated that $x_{recoil}/x_{max}=0.365$; if $F_o/F=100$ then $x_{recoil}/x_{max}=0.116$; if $F_o/F=1000$ then $x_{recoil}/x_{max}=0.025$ and if $F_o/F=10000$ then $x_{recoil}/x_{max}=0.004$.

During the positive exponential phase of the drive signal, which is for providing the slip part of the slip-stick cycle, similar considerations apply. It is thus desired that no slippage occurs during this phase, which is achievable by selecting the value of the characteristic value $\tau_1$ such that the condition $F<F_M$ is never fulfilled during this phase. It is therefore desired that $F>(Mx_{max}/\tau_1^2)\exp(-t/\tau_1)$ i.e. $\tau_1>\sqrt{(Mx_{max}/F_o)}$.

The value of $\tau_1$ is thus generally larger than that of $\tau_2$. It is the minimum value of $\tau_1$, defined by the non-slip condition $F<F_M$, which, for the first exemplary drive signal, ultimately limits the maximum possible drive frequency $f_{max}$. According to the above considerations $f_{max}=\sqrt{(F/Mx_{max})}$, from which it is apparent that maximum drive frequencies, i.e. $1/(T_1+T_2)$, will typically lie in the range of approximately 10 to 100 kilohertz.

The recoil motion described above is generally undesirable. It reduces energy efficiency and net positioning speed by reducing the net step size to $x_{max}-x_{recoil}$. The greater the recoil motion, the greater the amount of energy expended to produce a given displacement. This may be an important consideration in cryogenic applications. Moreover, when a negative exponential is used in the drive signal for the slip phase, as in the example of FIG. 4A or 4C, fluctuations in the frictional value F from step to step will result in fluctuations in step size, since this will cause step-to-step variation in the point on the negative exponential at which the condition $F=F_M$ is met, this point defining the onset of recoil.

Generally, the percentage fluctuation in step size will decrease as the value of $F_o/F$ increases. Assuming a 10% fluctuation of the frictional force value F, if $F_o/F=10$ then the step fluctuation caused is estimated to be 4.3%; if $F_o/F=100$ then 1.6% and if $F_o/F=1000$ then 0.16%.

FIG. 5 shows a drive circuit for generating a drive signal according to FIG. 4A or 4C. To generate the signal of FIG. 4A or 4C, a TTL signal according to FIG. 4B is applied as an input to a control circuit 10 which delivers two identical outputs via respective single-ended amplifiers 14 and 14' to the gates of respective enhancement-mode field effect transistors 15 and 15' configured with substrate tied to source. The source of FET 15' is connected to a DC voltage source, for example a zero to fifty volt source. The specification of the voltage source will depend on the desired peak signal voltage $V_{max}$. The drain of FET 15' is connected to one of a bank of resistors via a multipole switch 17', the other side of which resistors are connected together and lead to one terminal of a piezoelectric crystal oscillator 16. The drain of FET 15 is earthed. The source of FET 15 is connected to a further bank of resistors via a further multipole switch 17, the other side of which resistors are connected together and to those of the first mentioned bank of resistors and thus lead to the same terminal of the piezoelectric crystal oscillator 16. The other terminal of the piezoelectric crystal oscillator 16 is supplied either directly to the output of the circuit or to the output via an invertor 13, the supply route being determined by the position of a twin pole switch 12.

In operation, the speed of motion is determined by the frequency of the input square wave pulse train. Single asynchrous steps can also be produced by inputting individual pulses. One each of switches 17 and 17' are selected to define the rise and fall times $\tau_1$ and $\tau_2$ as shown in FIGS. 4A and 4C. The direction of motion is reversed by flipping switch 12.

Figure 6A:
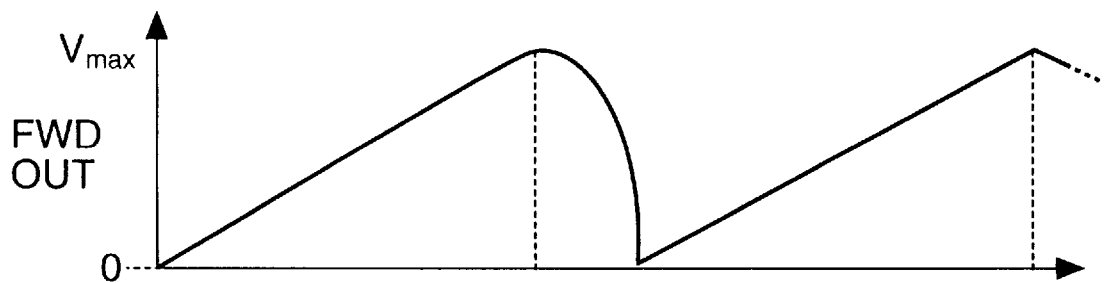
FIG. 6A Graph showing a second exemplary drive signal, having parabolical and linear portions, suitable for driving a positioner according to embodiments of the invention.
Figure 6B:
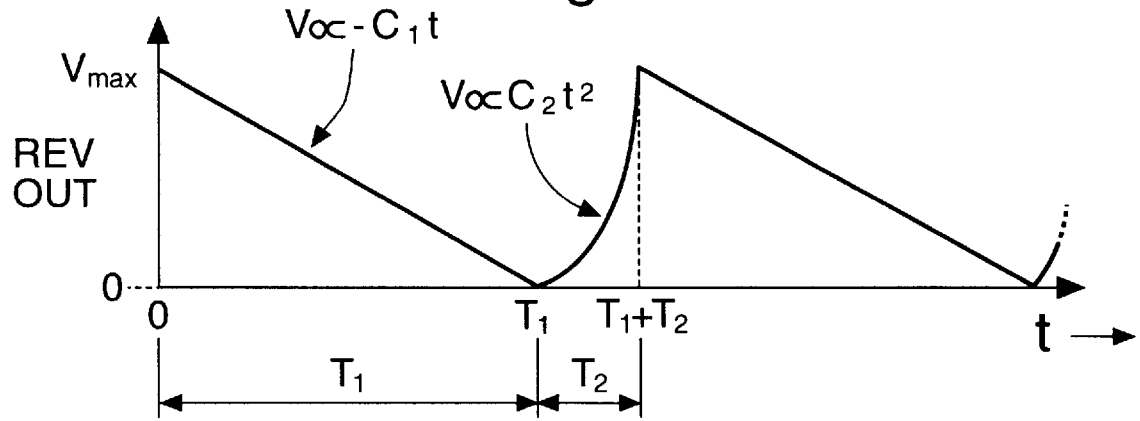
FIG. 6B Graph showing an inverted form of the first exemplary drive signal for driving a positioner in the opposite direction from the drive signal of FIG. 6A.

FIGS. 6A and 6B shows a second exemplary drive signal. The waveform shown in FIG. 6A will generate motion of the carriage 2 from left to right in FIG. 1A, whereas the inverted waveform shown in FIG. 6B will generate motion from right to left in FIG. 1A. These drive signals can for example be generated by a programmable function generator.

The drive signal shown in FIG. 6A is a voltage signal and has a generally sawtooth form. Each sawtooth has a linearly rising portion, rising over a time $T_1$ from zero voltage to a peak value $V_{max}$ with a rise rate characterised by a value $c_1$, and a decaying portion falling in an inverse parabola from the above-mentioned peak voltage value to zero over a time $T_2$ at a decay rate characterised by a value $c_2$.

The relationships corresponding to those of the drive signal of FIGS. 4A and 4C described above are $x=x_{max}(t^2/c_2^2)$, $a=2x_{max}/c_2^2$ and $F_M=2Mx_{max}/c_2^2$ so that the condition $F<F_M$ is given by $F<2Mx_{max}/c_2^2$. It is noted that for the signal of FIGS. 6A and 6B $F_M$ is invariant with time in contrast to the signal of FIGS. 4A and 4C.

During the linear portion of the drive signal $x=x_{max}-(x_{max}/c_1)t$ so that there is zero acceleration and thus $F_M=0$. The condition $F<F_M$ is thus never fulfilled during this phase, i.e. no slippage occurs during this phase as desired.

The drive signal according to FIGS. 6A and 6B has in principle several advantages over that of FIGS. 4A and 4C. The slip phase does not give rise to a recoil effect since $F_M$ is time invariant and selected such that $F_M>F$ throughout. Moreover, the stick phase does not limit the maximum drive frequency in the same way as for the signal of FIGS. 4A and 4C since the constraints imposed by the exponential time constant $\tau_1$ are not present.

These potential advantages are to be weighed against the added complexity of the drive circuitry required. For example, a function generator may have to be used to generate the signal of FIGS. 6A and 6C, whereas the relatively simple circuit of FIG. 5 can be used to generate the signal of FIGS. 4A and 4C. The most appropriate choice of drive signal will depend on the requirements of each individual application.

It will be appreciated that a real drive signal cannot reproduce discontinuities, such as at peak voltage in FIG. 6B, the voltage profile being rounded off in a real system.

A third examplary drive signal (not shown) is a variation of that shown in FIGS. 4A and 4C, in which the positive exponential component of FIGS. 4A and 4C is substituted with a linear component. In a concrete example, a commercial wave generator was used to generate a signal of the third exemplary kind having a linear portion with a rise/fall time adjustable between one second and one tenth of a millisecond, a negative exponential portion with a fixed decay constant of three microseconds and a peak voltage adjustable between zero and 100 volts.

The discussion of the drive signals is thus concluded.

Having explained above the basic design and operation of the positioner, further design considerations are now considered.

In the above it was implicitly assumed that all the components were infinitely stiff, that is of zero compliance. The piezoelectric element 4 and rod 5 are however of non-zero compliance and the consequences of this are now considered. The piezoelectric element 4 and rod 5 are treated as one-dimensional springs of spring constant $k_p$ and $k_s$ respectively. A spring constant, sometimes referred to as an elastic stiffness constant, is a measure of linear stiffness of a body and is inversely proportional to compliance. The effective spring constant of the combined piezoelectric element 4 and rod 5 $k_{ps}$ is given by $1/k_{ps}=1/k_p+1/k_s$.

The application of a rapidly increasing voltage to the piezoelectric element 4 is now considered with reference to FIG. 1A in order to explain the effect that non-zero compliance has on the operation of a positioner.

With the assumption of infinite stiffness (zero compliance) used further above, the application of a rapidly increasing voltage to the piezoelectric element 4 results automatically in an extension thereof, thereby pushing the rod with a force $F_M$ in excess of F, thus causing a resultant displacement of the rod 5 slipping against the friction F.

With the assumption of non-infinite stiffness, and additionally assuming that the rod is much stiffer than the piezo i.e. $k_s>>k_p$, the application of a rapidly increasing voltage to the piezoelectric element 4 does not initially cause slippage, but rather elastic compression of the piezoelectric element which is pushed up against the rod without overcoming the threshold of friction of the rod in the aperture. Slippage will be inhibited until a voltage $V_{min}$ has been reached at which point the force exerted by the piezoelectric element by virtue of the elastic energy generated from the piezoelectric effect will equal the reaction force from either the load represented by the carriage or the frictional force F. As the applied voltage continues to rise, the rod is pushed by the piezoelectric element with the piezoelectric element remaining under compression. At one extreme, if a voltage signal varying between zero voltage and a peak value $V_{max}$ is applied where $V_{max}<V_{min}$ then no motion will result. The piezoelectric element will just wobble back and forth in response to such a drive signal without ever unsticking the frictional engagement between rod 5 and base element 1. At the other extreme $V_{max}>>V_{min}$ and the assumption of infinite stiffness already discussed is applicable.

The value of $V_{min}$ can be approximated by equating the extension $\Delta l_e$ of the compliant piezoelectric element which is needed to generate a force of F with the deformation $\Delta l_p$ of the piezoelectric element as a function of applied voltage. The deformation is given by $\Delta l_e=F/k_p$ and the stiffness of the piezoelectric element $k_p$ for the case of a bar is defined by Young's modulus E, i.e. $k_p=EA/l$ where A is the area of the piezoelectric element over which the force is exerted and l is the length of the piezoelectric element.

The effect of the non-infinite stiffness of the piezoelectric element is to reduce step size by a factor of $(V_{max}-V_{min})/V_{min}$ compared to what it would be if the piezoelectric element 4 and rod 5 were infinitely stiff. The effect is illustrated schematically in FIG. 7 which is a graph of step size x against applied peak voltage $V_{max}$. If $V_{max} < V_{min}$ then no motion is produced. If $V_{max} > V_{min}$ then motion is produced but the step size is smaller than would be expected if zero compliance were assumed, in which latter case the curve shown would be a straight line intersecting the $V_{max}$ axis at the origin rather than at $V_{min}$. The curve is approximately linear above threshold. Ideally a positioner should be designed such that $V_{min} << V_{max}$.

Furthermore, the threshold voltage $V_{min}$ is of importance as its value defines a minimum for the peak voltage $V_{max}$. If for example $V_{min}$ is around 80 Volts as for example in Anders et al (see FIG. 4 thereof) then drive voltages peaking at several hundred volts need to be used, in which case the drive circuitry becomes relatively high voltage circuitry (>100 volts) with the ensuant cost, size and safety drawbacks. High voltage systems are also generally undesirable when the positioner is to be operated in a vacuum chamber or in a cryostat, in which latter case energy consumption considerations are also important, this being a further drawback of high voltage drive signals. The drive circuitry is preferably of low voltage construction and the voltages in the drive signal also of as low voltage as possible.

Figure 8:
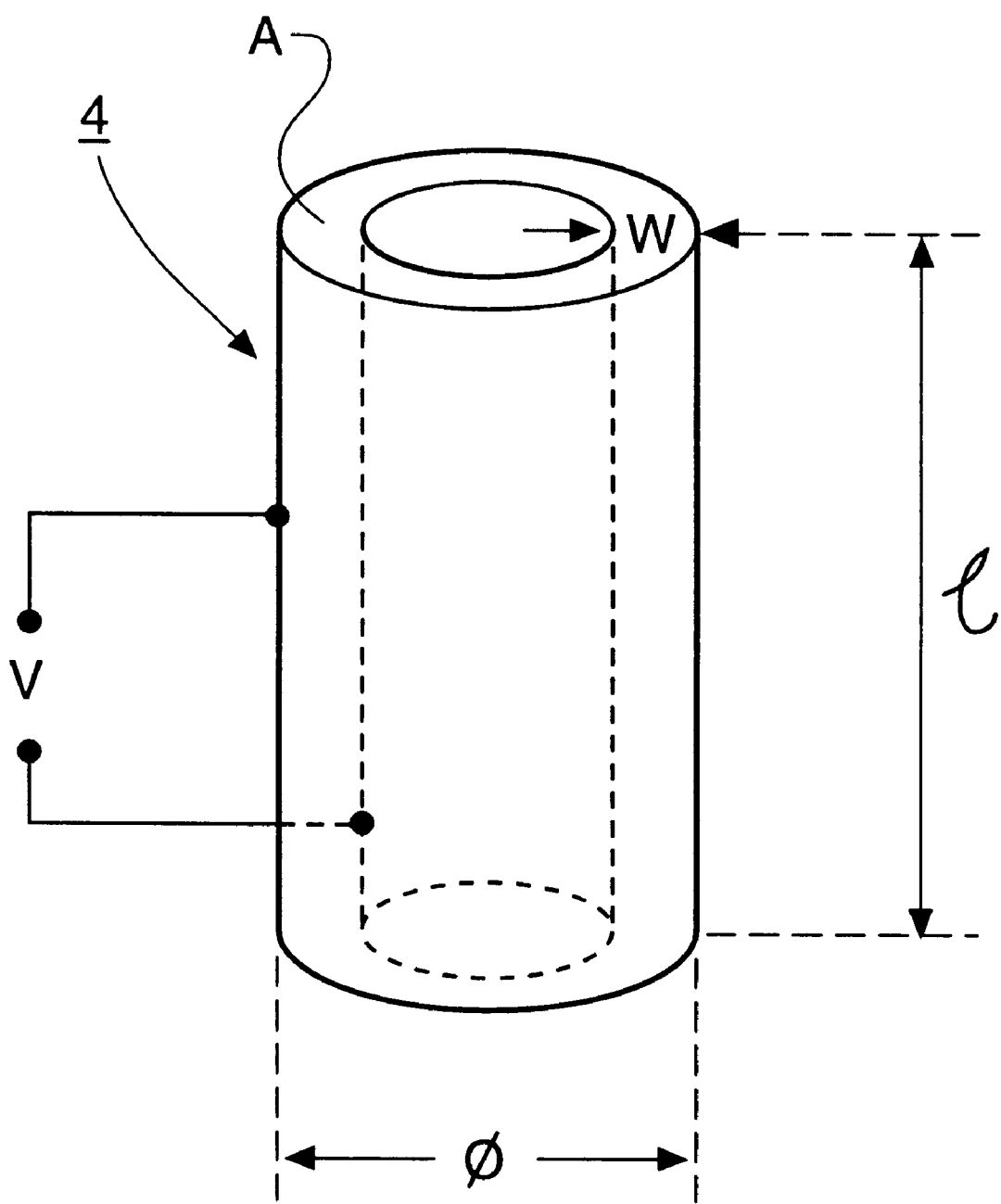
FIG. 8 Piezoelectric tube for use as the piezoelectric element.

FIG. 8 shows a piezoelectric tube of hollow cylindrical structure for use as the piezoelectric element. The tube has an outside diameter $\phi$, wall thickness W, length l and end-face area A, this being equal to the wall thickness W multiplied by the circumference $\pi\phi$ of the tube. An electrode layer extends around the outside surface of the cylinder and a further electrode layer extends around the inside surface of the cylinder, across which electrodes a voltage is applied in order to expand the tube lengthways along its principal axis.

Therefore for the tube $$\Delta l_e = F/k_{pT} = Fl/\pi E W \phi \qquad \_(1T)$$

and $$\Delta l_p = d_{31} l V/W \qquad \_(2T)$$

where $d_{31}$ is the appropriate piezoelectric tensor coefficient. The threshold voltage $V_{min}$ is given by equating $\Delta l_e$ and $\Delta l_p$ which gives $$V_{minT} = F/\pi d_{31} E \phi \qquad \_(3T)$$

From equation (3T) it is evident that the threshold voltage $V_{min}$, which should ideally be zero, does not depend on either the length of the tube l or its wall thickness W so that, perhaps contrary to intuition, providing a piezoelectric tube with thicker walls or with a greater length will not serve to reduce the threshold voltage. As is evident from equation (3T), what will serve to reduce the threshold voltage is to make the piezoelectric tube from a material with a large Young's modulus E and a large piezoelectric tensor coefficient $d_{31}$ and to choose a tube with a large diameter $\phi$.

By means of example, tubes having dimensions $\phi = 6$ mm, l=5 mm and W=0.5 mm and made of two commercially available piezoelectic materials are now considered, namely EBL4 and PI141 having 300K values of $d_{31}$ of $-95$ and $-115 \times 10^{-12}$ m/V respectively. If F=1N then $V_{min}$=6.1 and 5.8V respectively for EBL4 and PI141 with $\Delta l_p$=5.8 and 6.7 nm respectively. If F=10N then $V_{min}$=61 and 58V respectively for EBL4 and PI141 with $\Delta l_p$=58 and 67 nm respectively.

Figure 9:
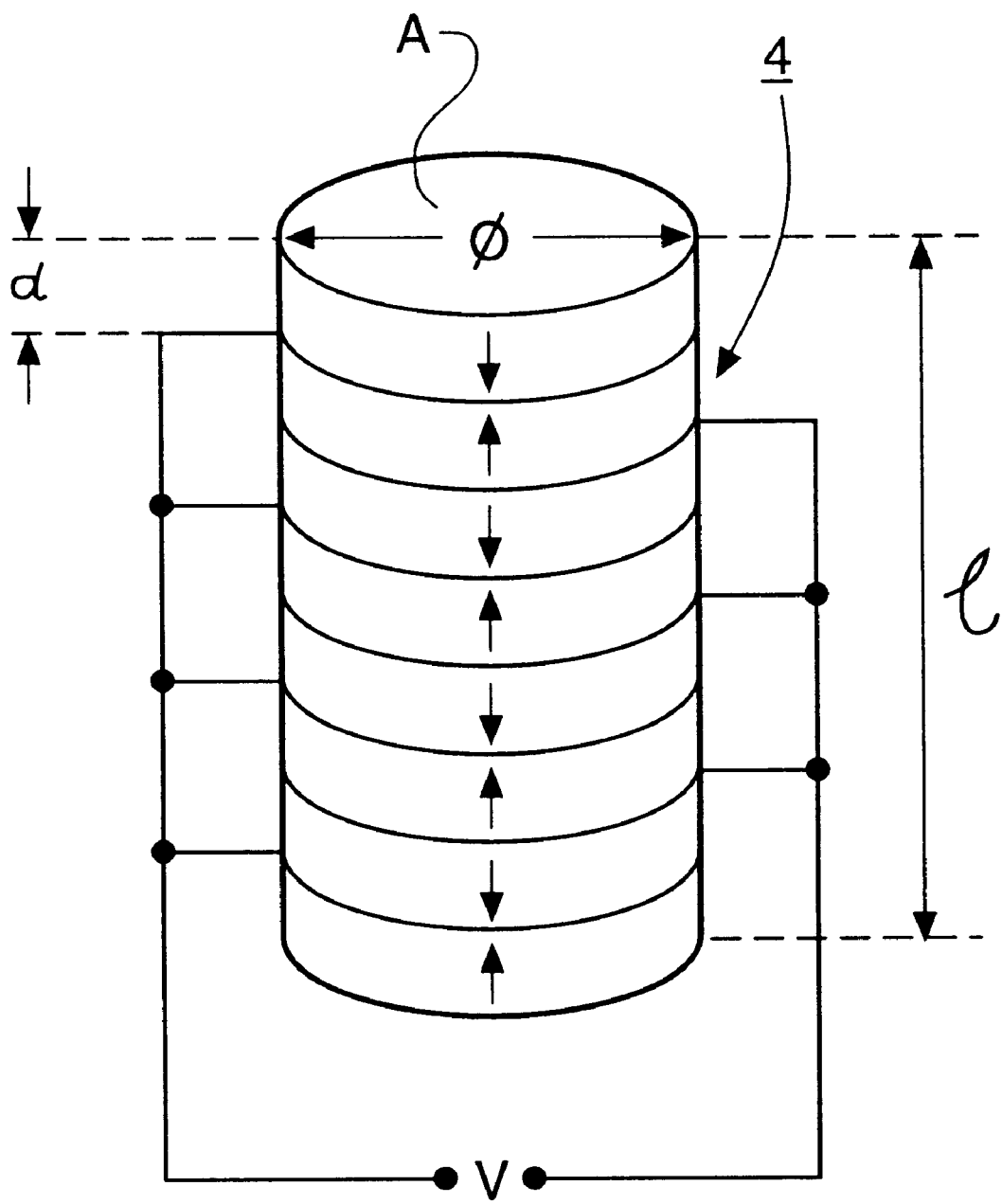
FIG. 9 Piezoelectric stack for use as the piezoelectric element.

FIG. 9 shows a piezoelectric stack of cylindrical structure for use as the piezoelectric element. The stack has a circular crosssection and is built up of n platelets of piezoelectric material each of thickness d and diameter $\phi$ yielding a stack of height l. Each platelet is separated by an electrode layer, the thickness of which is assumed to be negligible, via which voltage is applied to distort the stack lengthways along its principal axis.

Following a similar analysis as for the tube one obtains $$\Delta l_e = F/k_{pS} = 4lF/\pi E \phi^2 \qquad \_(1S)$$

and $$\Delta l_p = d_{33} n V \qquad \_(2S)$$

where $d_{33}$ is the appropriate piezoelectric tensor component. The threshold voltage $V_{min}$ is obtained, as for the tube, by equating $\Delta l_e$ and $\Delta l_p$ and gives $$V_{minS} = 4dF/\pi d_{33} E \phi^2 \qquad \_(3S)$$

The relative merit of using either a tube or stack for the piezoelectric element is now considered.

The ratio of stiffnesses $k_{pT}/k_{pS}$ of a tube and a stack of the same external diameter $\phi$ and length l respectively is given by $$k_{pT}/k_{pS} = (d_{33}/d_{31})(W/d) \qquad \_(4)$$

Taking as an example the ceramic material PI141, which has piezoelectric coefficient values of $d_{33} = 330 \times 10^{-12}$ m/V and $d_{31} = 115 \times 10^{-12}$ m/V, and a piezoelectric element of diameter $\phi = 6$ millimeters, wall thickness (tube) W=0.5 millimeters and platelet thickness (stack) d=50 micrometers, a value $k_{pT}/k_{pS} = 28$ is yielded from equation (4). That is, in this example, the tube is much less stiff than the stack of the same outside dimensions. Given that the piezoelectric element should be as stiff as possible to provide a low threshold voltage $V_{min}$ as discussed above, a piezoelectric stack is preferred, at least for the material PI141.

The ratio of threshold voltages for a tube and stack of the same outside dimensions is obtained from dividing through equations (3) and is given by $$V_{minS}/V_{minT} = (4d_{31}/d_{33})(d/\phi) \qquad \_(5)$$

For the same example as used for equation (4), equation (5) gives $V_{minS}/V_{minT} = 1/86$. That is the threshold voltage of the tube is almost two orders of magnitude larger than that of the stack of the same outside dimensions. A piezoelectric stack is thus preferred over a tube, at least for the material PI141.

It will be understood that piezoelectric stacks of circular cross-section was considered in the above analysis to allow a direct comparison with piezoelectric tubes, which are circular in cross-section. Piezoelectric stacks of other cross-sectional shapes, such as square, are also suitable.

The discussion of the design of the piezoelectric element is thus concluded.

The design of the rod 5 is now considered. The rod 5 should be stiffer than the piezoelectric element 4 so as to avoid rod distortion during operation, which for example may result in wide step-to-step fluctuations in F or even jamming.

In the following, the equations and numerical examples are for a rod of circular cross-section, as illustrated in FIG. 3. The rod may however be for example of square-section, as illustrated in FIG. 2, or of rectangular cross-section or of semicircular or triangular cross-section.

The spring constant (i.e. stiffness) of a cylindrical rod of length l and diameter φ is given by $$k_s = \pi E \phi^2 / 4l \qquad (6)$$

where E is the Young's modulus of the rod which, in the case of a solid rod, will be the Young's modulus of the material from which the rod is made.

From equation (6) it is evident that, the thicker and shorter the rod, the stiffer it will be, noting however that the length of the rod may not be a free design parameter, since rod length limits may be the limiting factor defining the range of travel of the positioner.

From equation (6) it is also evident that, the rod should have, and thus be made of a material having a large Young's modulus. Consequently, materials with a relatively low Young's modulus such as quartz ($5.44 \times 10^{10} N/m^2$), brass (also 5.4) and aluminum (7.6) are not generally preferred as rod material, although working devices could be made using such material. Phosphor bronze (12) has a larger value than for example the ceramic piezoelectric materials PI141 (7.9) or EBL4 (9.2) ceramic, i.e. a suitable material for the piezoelectric element, and could perhaps be used. However, the preferred materials are stainless steel (20) and tungsten (39). Stainless steel is less costly than tungsten and more readily machined and is thus an attractive alternative to tungsten despite the fact that its Young's modulus is only roughly one half of that of tungsten. For some applications, titanium is the preferred material, since although its Young's modulus (10.2) is only approximately half that of stainless steel it is inert and non-magnetic and thus suited respectively to biological and high-magnetic field applications.

From equation (6) it can be appreciated that some intuitive ideas regarding design are incorrect. For example, the idea that the rod should be needle-like in form to ease its passage through its matched aperture is wrong, since any reduction in rod diameter φ (or any other measure of cross-sectional area if the rod is not of circular cross-section) or any increase in rod length l will make the rod less stiff and thus degrade the performance of the positioner. Moreover, softness and hardness can intuitively be linked to compliance and stiffness respectively, although a hard material such as quartz is in fact compliant and thus generally unsuited for use as the rod material.

However, in certain applications the choice of material will be dictated by the application in which case equation (6) can still be utilised as a design equation in respect of the rod dimensions.

The discussion of the design of the rod is thus concluded.

A second embodiment of the invention is now described with reference to FIGS. 10A to 14 of the accompanying drawings.

Figure 13A:
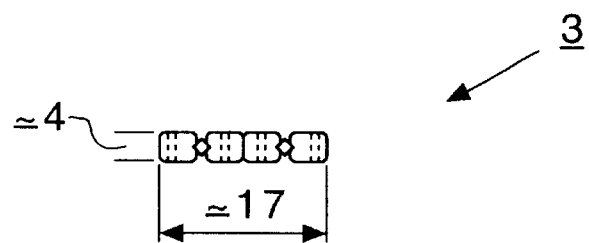
FIG. 13A Technical drawing of a bearing assembly comprising two sets of two crossed-roller bearings according to the second embodiment of the invention.
Figure 13B:
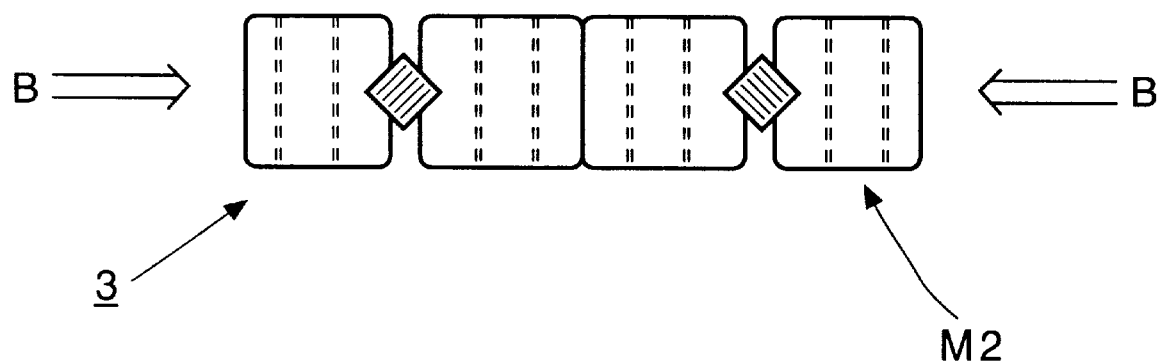
FIG. 13B An enlarged schematic representation of FIG. 13A.
Figure 14:
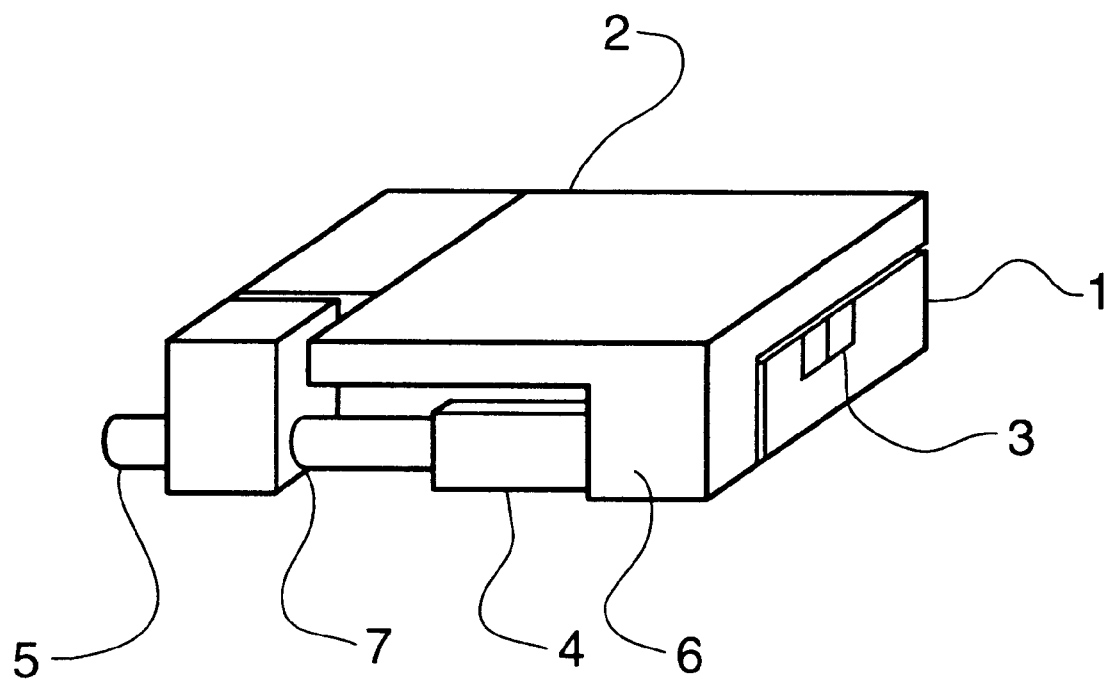
FIG. 14 Schematic perspective view of a positioner according to the second embodiment of the invention assembled from the components shown in FIGS. 10A to 13.

The positioner of the second embodiment comprises four main components: a lower plate 1 (FIGS. 10A, 10B, 10C, 10D, 10E, and 10F) serving as the base element, an upper plate 2 (FIGS. 11A, 11B, and 11C) serving as the carriage element, an elongate actuator assembly 4/5/6 (FIGS. 12A and 12B) and a bearing assembly 3 (FIGS. 13A and 13B), the assembled positioner being shown schematically in perspective view in FIG. 14. The external dimensions of the positioner of the second embodiment are 28×28×10 millimeters. The positioner of the second embodiment is designed to operate with a 100 nanometer step size and a total travel of approximately 1 centimeter.

FIGS. 10A, 10B, 10C, 10D, 10E, and 10F are collectively a technical drawing to scale in first angle projection of the lower plate 1. Lower plate 1 has precision machined therein a through hole 7 of diameter 3.000 mm, hole 7 being for receiving rod 5 of the actuator assembly to form a barrel and piston arrangement having a relative frictional engagement characterised by a force F. In final assembly, the diameters of rod 5 and/or hole 7 are adjusted by polishing or other standard methods to produce a push fit of the required frictional force value F. The magnitude of the force F can be measured as polishing or the like procedes using a calibrated force guage. In the side elevation of FIG. 10B taken along the axis of precision through hole 7, the U-shaped cross-section of the plate in which the bearing assembly 3 is received can be seen.

FIGS. 11A, 11B, and 11C are collectively a technical drawing to scale in first angle projection of the upper plate 2. The through hole 8 in the upper plate is for receiving a location stub 6 of the actuator assembly. As is evident from the plan elevation of FIG. 11A, an M2 thread is provided for receiving a grub screw for securing the location stub 6, and thus one end of the actuator assembly, to the upper plate 2. It can thus be appreciated that the second embodiment is more akin to the positioner shown in FIG. 1B than that shown in FIG. 1A, in that the frictional engagement exists between rod and lower plate (base element) rather than rod and upper plate (carriage). Stub 6 has no key functional role and can be dispensed with in variations on the design. For example, the piezoelectic stack could be glued with epoxy resin directly onto a face of the upper plate. Location of the piezoelectic stack could then be provided by machining a small recess at the desired area.

Figure 12A:
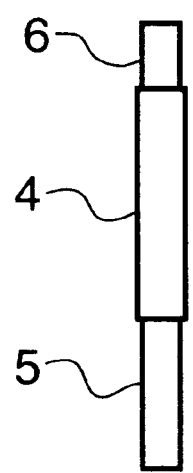
FIG. 12A Technical drawing of an actuator element comprising a piezoelectric stack and rods of a positioner (actuating element) according to the second embodiment of the invention.
Figure 12B:
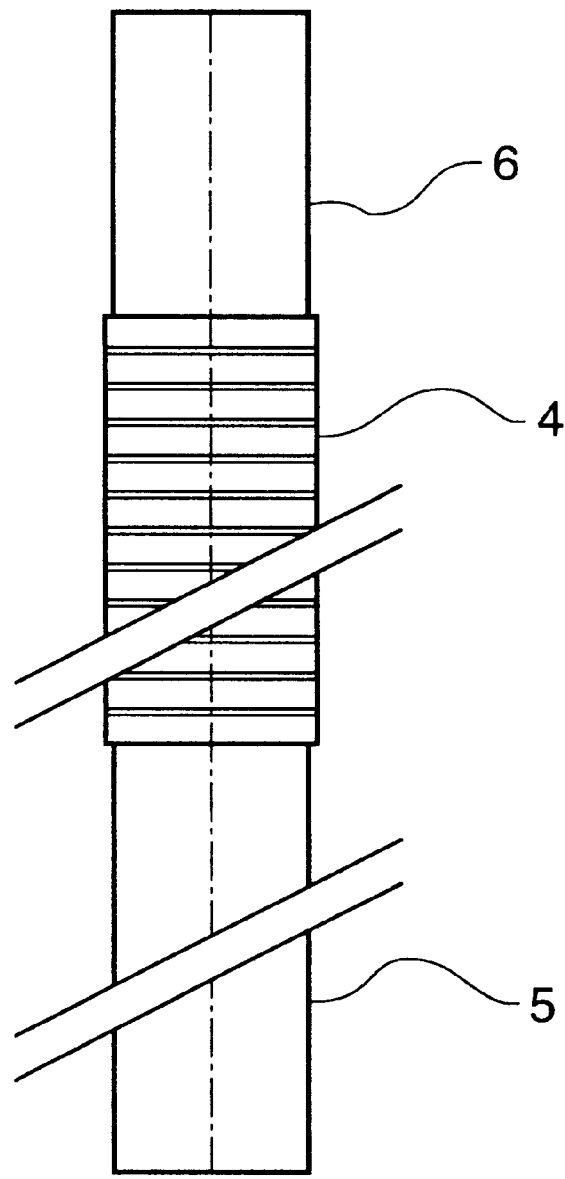
FIG. 12B An enlarged schematic representation of FIG. 12A.

FIGS. 12A and 12B show the actuator assembly which is elongate and comprises rod 5, piezoelectric element 4 and a further rod 6. FIG. 12A is drawn to the same scale as FIGS. 10A, 10B, 10C, 10D, 10E, 10F, 11A, 11B, and 11C for ease of comparison, whereas FIG. 12B is an enlarged schematic representation. Piezoelectric element 4 is a piezoelectric stack of one-eighth inch diameter (i.e. φ=3.175 mm), platelet thickness d=0.508 mm and length l=21 mm, the stack thus comprising approximately 40 individual platelets (n=40). The stack extends by one nanometer per 0.341 volts applied at room temperature. Rod 5 is made of stainless steel and has a length l=13.5 mm and diameter φ=3.000 mm. Further rod 6 serves as a locating stub and is referred to as a stub to differentiate it from rod 5. Stub 6 is made of stainless steel and has a length l=5 mm and diameter φ=3.00 mm. Rod 5, piezoelectric stack element 4 and stub 6 are glued together at their abutting end surfaces with epoxy resin.

FIGS. 13A and 13B show the bearing assembly 3. FIG. 13A is drawn to the same scale as FIGS. 10A, 10B, 10C, 10D, 10E, 10F, 11A, 11B, and 11C for ease of comparison, whereas FIG. 13B is an enlarged schematic representation. The bearing assembly 3 comprises two pairs of crossed roller bearings, each of the four cages having two threaded bores running therethrough. The two pairs of bearings are received between the upper and lower plates 2 and 1 and located by means of screws passing through the respective sets of four M2 counterbore through holes in the upper and lower plates into the threads in the roller cages. The outer ones of each pair of roller bearing cages are each secured by two screws to the lower plate (FIGS. 10A, 10B, 10C, 10D, 10E, and 10F) and the inner ones each by two screws to the upper plate (FIGS. 11A, 11B, and 11C). The bearing pairs are biased to their preload value by applying force laterally in the direction shown by the arrows B in FIG. 13B. The biasing force, which is adjusted at the end of assembly, is applied by means of three M2 grub screws fitted to the threads in the lower plate, which threads are evident in the two elevations of FIGS. 10C and 10D. Other types of bearing, for example linear ball bearings, could also be used.

In operation, the positioner according to the second embodiment moves a mass of 100 grammes attached to the upper plate in any direction including vertical at speeds of one millimeter per second. A mass of half a kilogramme is moved when the positioner is mounted horizontally.

When the positioner is mounted horizontally, the load resulting from an object mounted on the upper surface of the upper plate 2 produces forces acting perpendicular to the direction of movement so that the step size will be independent of the mass of the object to be moved regardless of the functional form of the drive signal, e.g. even for the drive signal illustrated in FIG. 4. Moreover, the value of the frictional force F is independent of the mass of the object for any mounting orientation, since, due to the design, the object to be moved, or any other type of load, does not press on rod 5, the force being received by bearing assembly 3. This is a major advantage since the positioner will operate substantially the same for a wide range of object masses, or other vertically applied loads, when the positioner is mounted horizontally. The positioner can thus be supplied with a general specification for horizontally mounted operation in which step size as a function of peak drive voltage is independent of object mass over a wide range of object masses.

A variation of the second embodiment of the invention is now described which is the same as that of the second embodiment except in the following respects: Rod 5 is a square-section rod, as shown in FIG. 2, rather than a circular-section rod. The square section rod 5 is held substantially as shown in FIGS. 2A and 2B in the lower plate 1 in the same position as the rod of the second embodiment. A calibrated force guage was used in the manner described further above to set the frictional force F, in each case to a value greater than one Newton. Rod 5 has a length of 12 mm and a square cross-section of dimensions 5 mm by 5 mm. Piezoelectric element is cylindrical, being 7 mm long and 5 mm in diameter and extends along its principal axis by four nanometers per 0.150 volts applied. Stub 6 is dispensed with, piezoelectric stack being glued directly to the upper plate as mentioned above in connection with the second embodiment. The upper plate (carriage) has a mass of thirty grammes.

In operation, a drive signal according to the above-described concrete example of the third exemplary kind was used. At room temperature the threshhold voltage $V_{min}$ was approximately 8 volts, no motion resulting if $V_{max} < 8V$. Just above threshold with $V_{max}$ set at 8 volts and a drive frequency of 10 kHz a speed of approximately 0.5 mm/sec was observed, from which a step size of 50 nanometers can be deduced. General operation was performed with $V_{max}$ set at 20 volts. At this peak voltage and with a drive frequency of 10 kHz a speed of approximately 3 mm/sec was observed, from which a step size of 300 nanometers can be deduced. Speeds as low as 5 mm per day were produced. When placed horizontally, loads of half a kilogramme were moved. When placed vertically, loads of fifty grammes could be moved against gravity. No change in performance was observed when the positioner was placed in a vacuum of approximately $10^{-4}$ Pascal. When the positioner was placed in a cryostat and cooled to 4.2 Kelvin, the threshold voltage $V_{min}$ increased to thirty volts, but reliable operation was still observed. For cryogenic operation, the engaging surfaces between square-section rod 5 and its supporting V-grooves in collar 20 and lower plate 1 were smeared with molybdenum sulfide, a cryogenic solid lubricant.

FIG. 14 shows the positioner of the second embodiment in perspective view with the lower plate 1 of FIGS. 10A, 10B, 10C, 10D, 10E, and 10F the upper plate 2 of FIGS. 11A, 11B, and 11C the elongate actuator assembly 4/5/6 of FIGS. 12A and 12B and the bearing assembly 3 of FIGS. 13A and 13B visible.

The positioner of the second embodiment has a total mass of 35 grammes of which the carriage has a mass of 11 grammes and the rod a mass of 1.1 grammes.

Typical values selected for the frictional force F in the second and third embodiments are 0.5 to 1.5N. In the positioners in which resilient biasing means for the rod is provided, for example with a compression spring or leaf spring, this value can be adjusted when desired to the value required.

Figure 15:
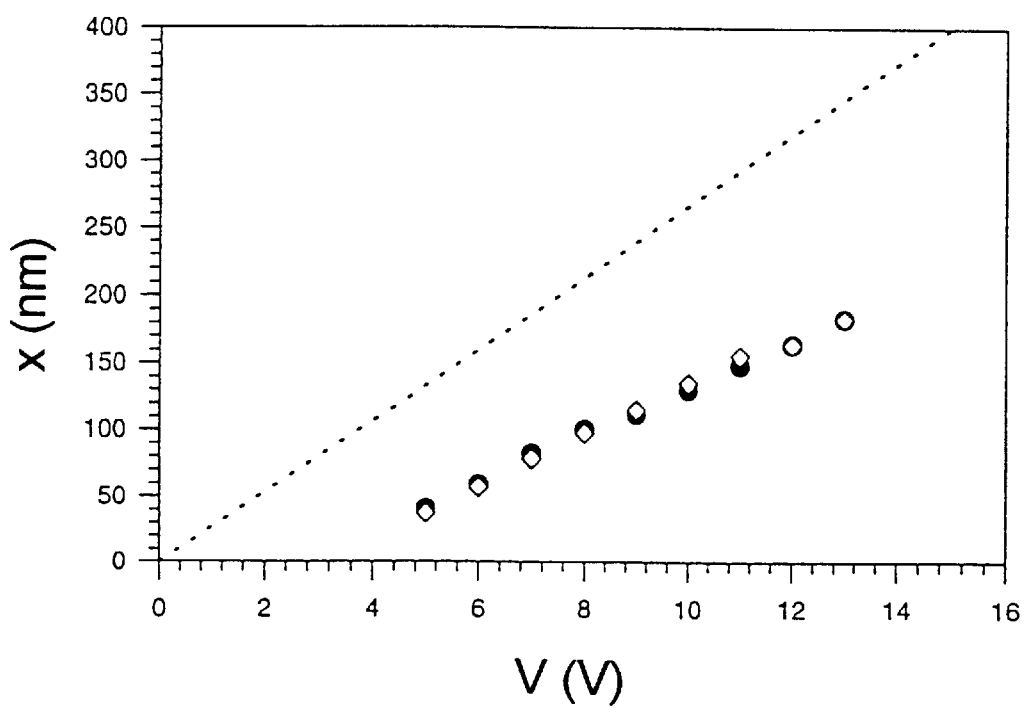
FIG. 15 Graph showing test results of step size x plotted against peak voltage V of the drive signal for a positioner according to the second embodiment at room temperature.

FIG. 15 is a graph of test results taken during room temperature operation of the positioner of the second embodiment arranged such that movement is in the horizontal plane (xy-positioner). The graph shows the variation in step size x as a function of the peak voltage of a saw-tooth wave form applied as the drive signal. (A saw-tooth wave form is also used in the subsequent test curves of FIGS. 16, 19, 20 and 21).

The step sizes shown are average step size values taken over a path of several millimeters. At each peak voltage the positioner was traversed in one direction to provide a first data point, these data points being represented by hollow diamonds in FIG. 15, and then traversed in the return direction with the inverse wave form of the same modulus peak voltage and with the same total number of pulses to provide a second data point, these data points being represented by solid circles in FIG. 15. The dashed line passing through the origin is the ideal response for an infinitely stiff drive train. (A similar procedure was followed when measuring the subsequent test curves of FIGS. 16, 19, 20 and 21).

The data of FIG. 15 was measured with a frictional force F=0.8N, a drive frequency of 1 kilohertz, a travel of 3.12 millimeters and a load placed on the carriage of mass 114 grammes. The results show no observable variation between step size in the two travel directions. Moreover, further testing with different loads of between 0 and 200 grammes placed on the carriage 2 showed no observable variation in step size.

The threshold voltage Vmin, discussed further above with reference to FIG. 7, was observed to be approximately 4 volts.

As can be seen from FIG. 15, step size can be varied as desired in a reproducible manner by varying the peak voltage of the drive signal, so that a high degree of flexibility of operation can be achieved with the same positioner simply by changing the magnitude of the drive signal. In the example of FIG. 15, step sizes of 50 nanometer or above can be selected.

In use, drive frequencies of 1 kilohertz are typically used for 'rapid' movement which, with reference to FIG. 15, corresponds at room temperature to a speed of travel of approximately 50 μm/s to 200 μm/s for drive signals having peak voltages of 5 to 15 V respectively. Lower frequencies or single pulses can be used as desired by the application concerned.

Figure 16:
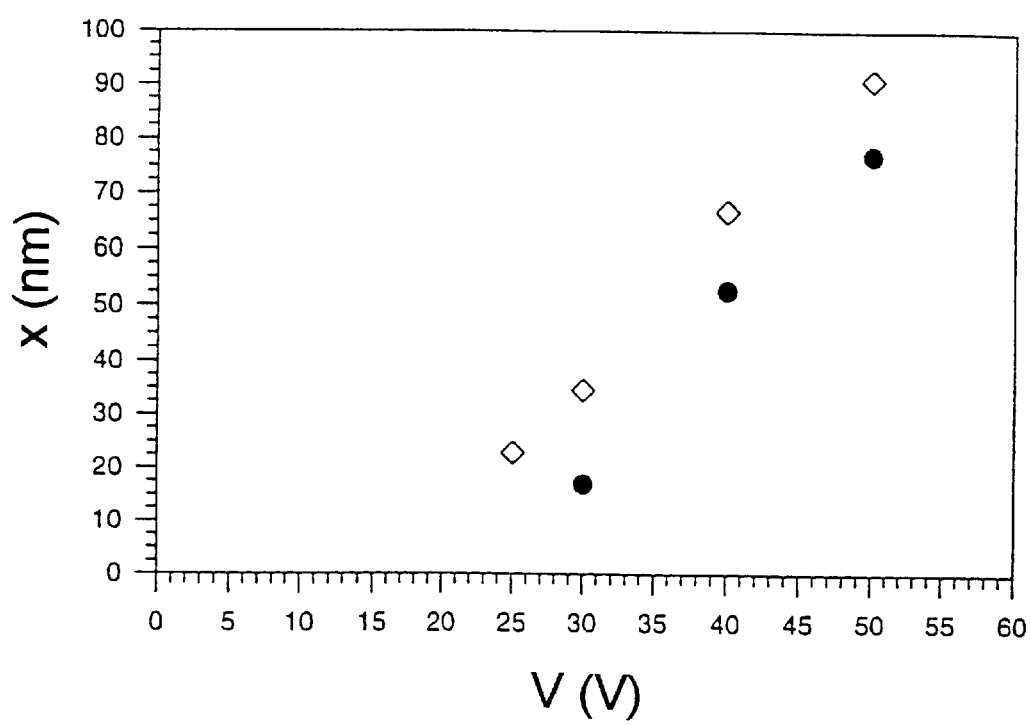
FIG. 16 Graph showing test results for the same positioner as in FIG. 15, but at a temperature of 4.2 Kelvin.

FIG. 16 is a graph showing the results of a test similar to that described with reference to FIG. 15, but taken at a temperature of 4.2 Kelvin. The data was measured with a frictional force F=0.8N, a drive frequency of 500 hertz and a travel of 0.5 millimeters. At 4.2 Kelvin, the step size is observed to be considerably smaller than at room temperature and the threshold voltage of around 20 volts to be considerably higher. This is owing to the reduction in the magnitude of the piezoelectric coefficients as temperature decreases. Step sizes of 15 nanometers or above can be selected. A relatively small, but systematic discrepancy in step size between forwards movement (solid circles) and backwards movement (hollow diamonds) is also observed, which was not the case for room temperature operation. In typical use, the peak voltage of the drive signal was set to around 50 volts.

Figure 17:
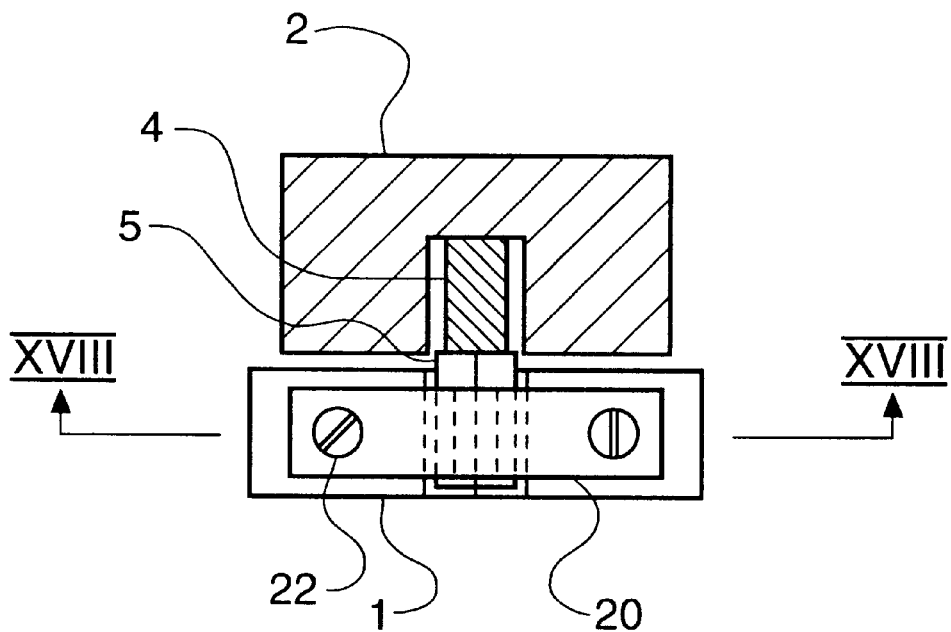
FIG. 17 Side view of a positioner according to a third embodiment of the invention, with the upper parts shown in section taken through section XVII of FIG. 18.
Figure 18:
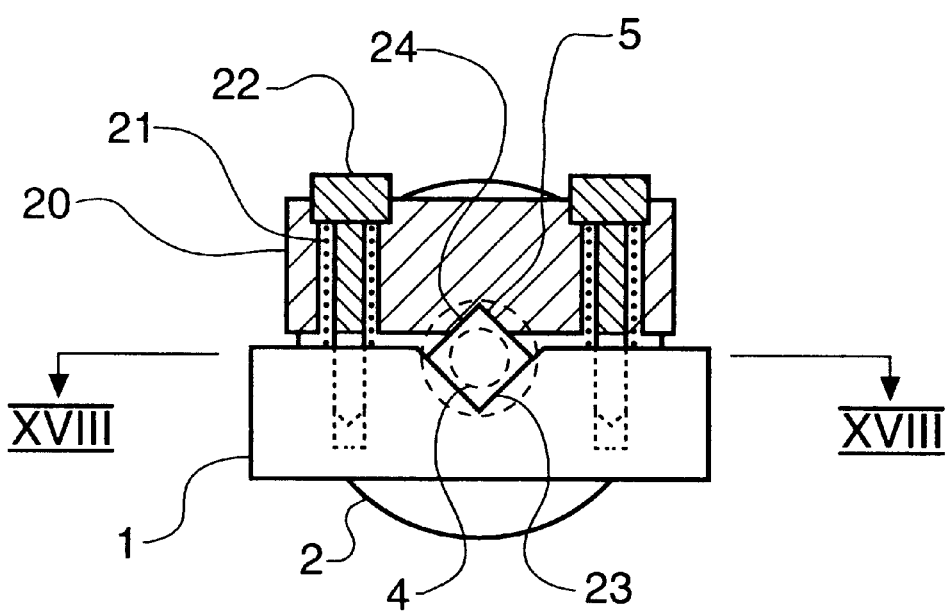
FIG. 18 Plan view from underneath of the positioner of FIG. 17, with the upper parts shown in section taken through section XVIII of FIG. 17.

FIGS. 17 and 18 show a positioner according to a third embodiment of the invention respectively in side view and in plan view from underneath. The upper part of FIG. 17 is shown in section through the section XVII of FIG. 18 to reveal more clearly the piezoelement 4 and its arrangement relative to the carriage 2 and rod 5. The upper part of FIG. 18 is also shown in section, with the section being through the section XVIII of FIG. 17 and made to reveal more clearly the spring biasing arrangement of the rod 5 in its receiving aperture 23 and 24.

By contrast to the positioner of the second embodiment, the positioner of the third embodiment has no bearing assembly but uses the rod and rod receiving parts for guidance.

The carriage 2 is cylindrical with an axially positioned hollow in one end face of the cylinder for receiving one end of the piezoelement 4, the other end of which is adhesively bonded to the square-section rod 5. The rod is biased with a pair of screws 22 and coil springs 21 mounted in a collar 20 in an arrangement similar to that described with reference to FIG. 2, the screws being received in threads in the base 1 to allow a desired biasing force F to be adjusted by adjustment of the screws 22 to vary the degree of compression in the springs 21.

In use, the mutually sliding surfaces of the square-section rod 5 and V-grooves 23 and 24 of the positioner illustrated have shown no signs of wear, which we attribute to the large mutual contact areas. By contrast, if a circular-section rod is used in conjunction with a V-groove seat wear is observed, which we attribute to the small mutual contact areas that approximate to lines of mutual contact. It thus appears to be advisable to provide a large area of contact between rod 5 and seat 23 and 24, as is provided for example by either of the arrangements shown in FIGS. 2 and 3.

The positioner of the third embodiment has a total travel of approximately 4 millimeters and a total mass of 79 grammes of which the carriage has a mass of 45 grammes and the rod a mass of 1.8 grammes. The rod 5 is made of steel and has a square section of 5 by 5 millimeters. The base area defined by the base element 1 and collar 20 is approximately 20 by 27 millimeters. The height is approximately 28 millimeters.

Figure 19:
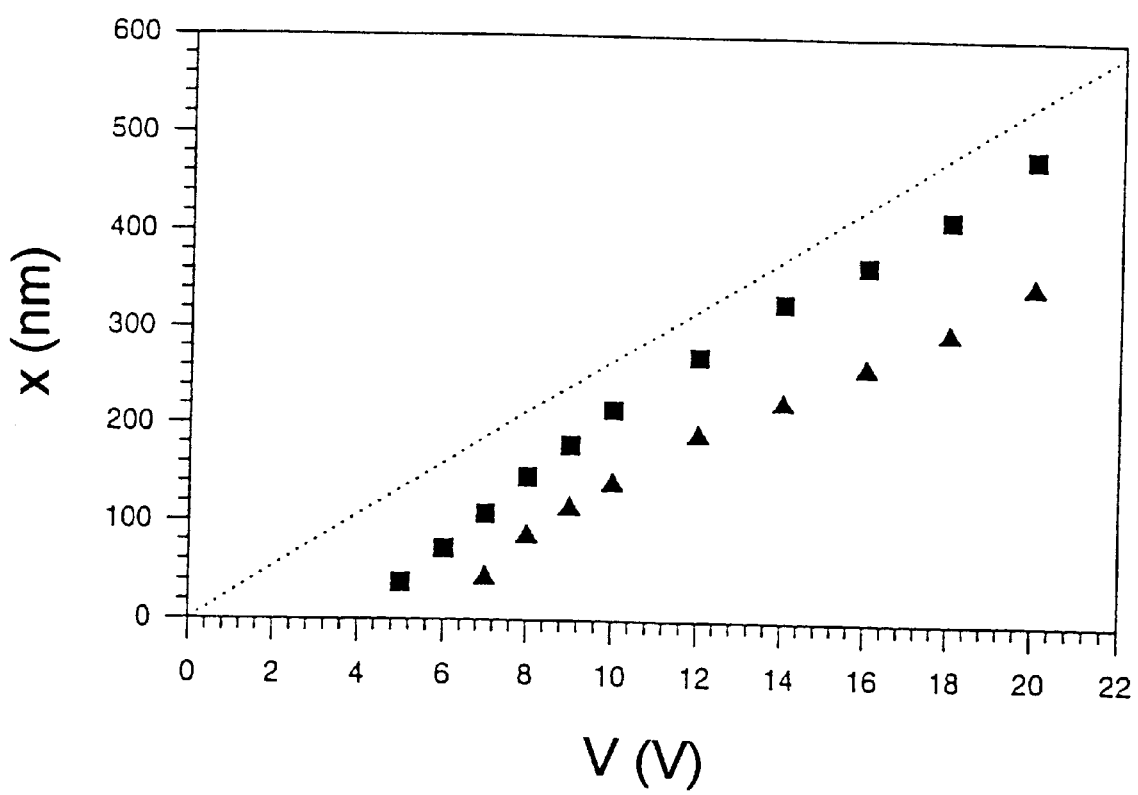
FIG. 19 Graph showing test results of step size x plotted against peak voltage V of the drive signal for a positioner according to the third embodiment at room temperature.

FIG. 19 is a graph of test results taken during room temperature operation of the positioner of the third embodiment arranged such that the movement is vertical (z-positioner). The graph shows the variation in step size x as a function of the peak voltage of a saw-tooth wave form applied as the drive signal. The test measurements were taken at a drive frequency of 500 hertz over a travel of 3.1 millimeters.

In contrast to the equivalent test results for the positioner of the second embodiment shown in FIG. 15, there is a systematic difference in step size for the different directions, the data for upwards movement being shown with triangles and that for downwards movement with squares. This difference is due to the influence of gravity which exerts a biasing effect on the piezoelement 4 and also affects the ratio $F_o/F$. The threshold voltages $V_{min}$ for downwards and upwards movement are 4 and 6 volts respectively. The dashed line indicates ideal operation as discussed with reference to FIG. 15.

Figure 20:
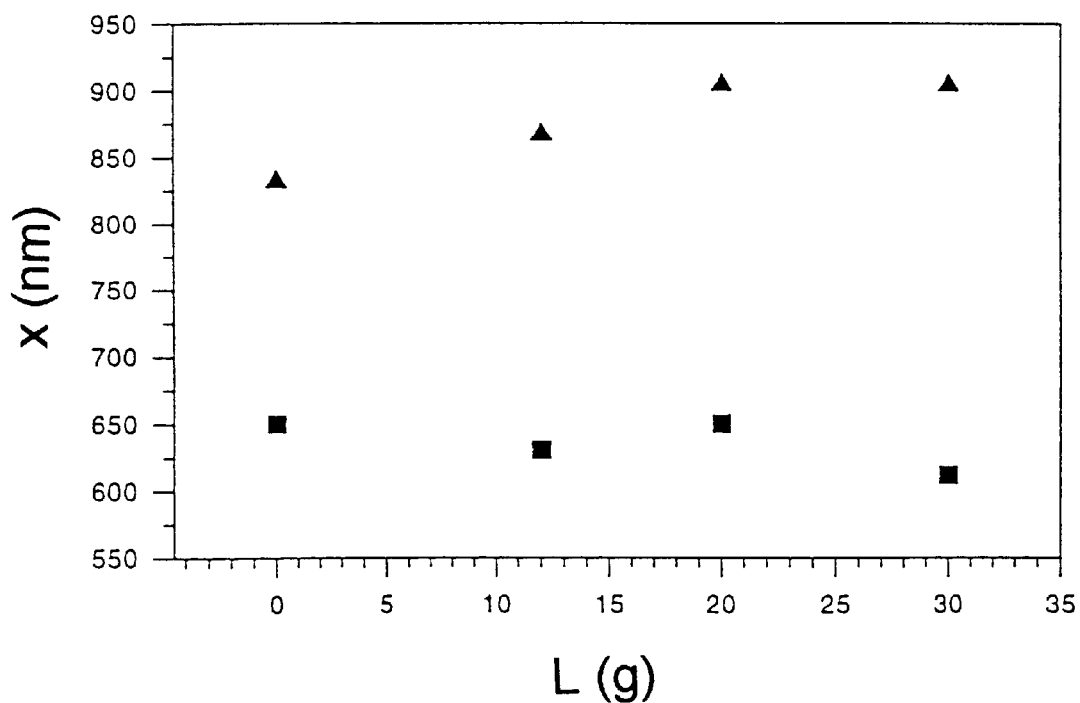
FIG. 20 Graph showing test results of step size at room temperature with different loads placed on the carriage.

The sensitivity of the positioner of the third embodiment when arranged to provide vertical movement (z-positioner) to variations in load is shown in FIG. 20. Measurements were taken with loads of 12, 20 and 30 grammes placed on the carriage 2. The measurements were taken with a drive signal having a peak voltage of 40 volts. As can be seen from FIG. 20, no significant variation in step size x was observed at room temperature between upwards movement (squares) and downwards movement (triangles) as the load was varied from zero to a load of 30 grammes, although the difference in step size between upwards and downwards movement, already apparent from FIG. 19, is evident.

Figure 21:
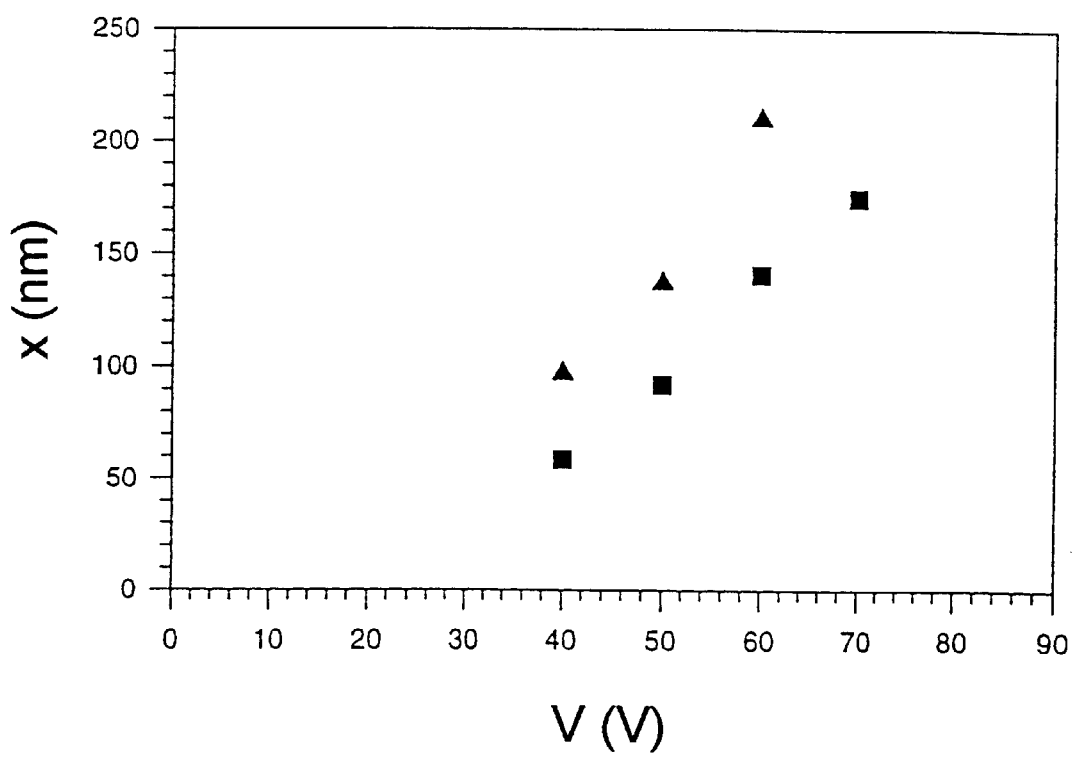
FIG. 21 Graph showing test results for the same positioner as in FIG. 19, but at a temperature of 4.2 Kelvin.

FIG. 21 is a graph showing the results of a test similar to that described with reference to FIG. 19, but taken at a temperature of 4.2 Kelvin. The differences in comparison to room temperature operation are similar to the differences discussed with reference to FIGS. 15 and 16 for the second embodiment. The difference in step size for upwards movement (squares) and downwards movement (triangles) is around 50 nanometers. The minimum step sizes that can be set are approximately 50 nanometers for upwards movement and 90 nanometers for downwards movement.

The positioner of the third embodiment can be placed on the positioner of the second embodiment to provide an xyz-positioner, it being noted that the test results shown in FIG. 15 were taken with the positioner of the third embodiment, having a mass of 114 grammes, placed upon it.

Figure 22:
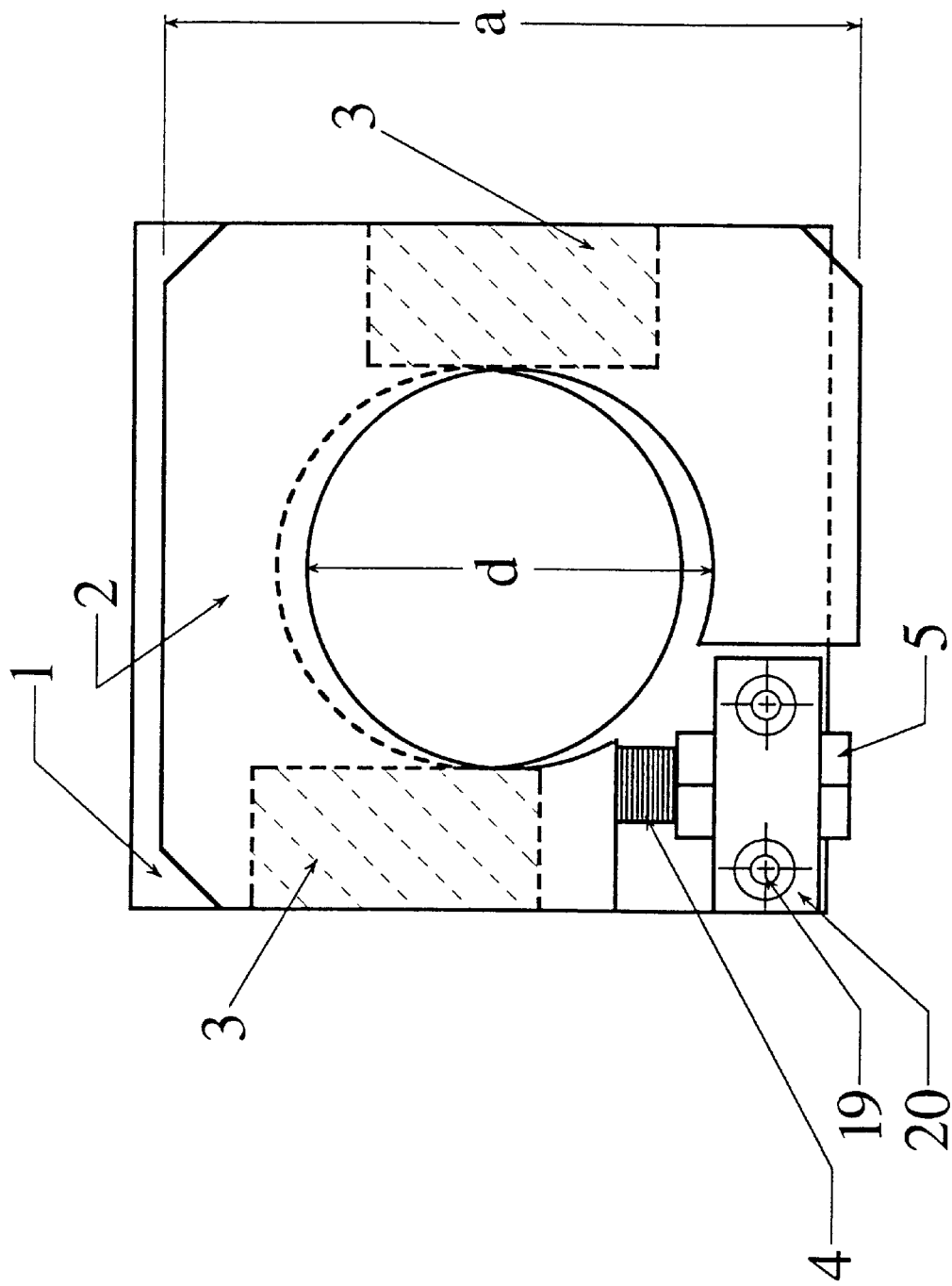
FIG. 22 A schematic plan view of a positioner according to a fourth embodiment of the invention.
Figure 23:
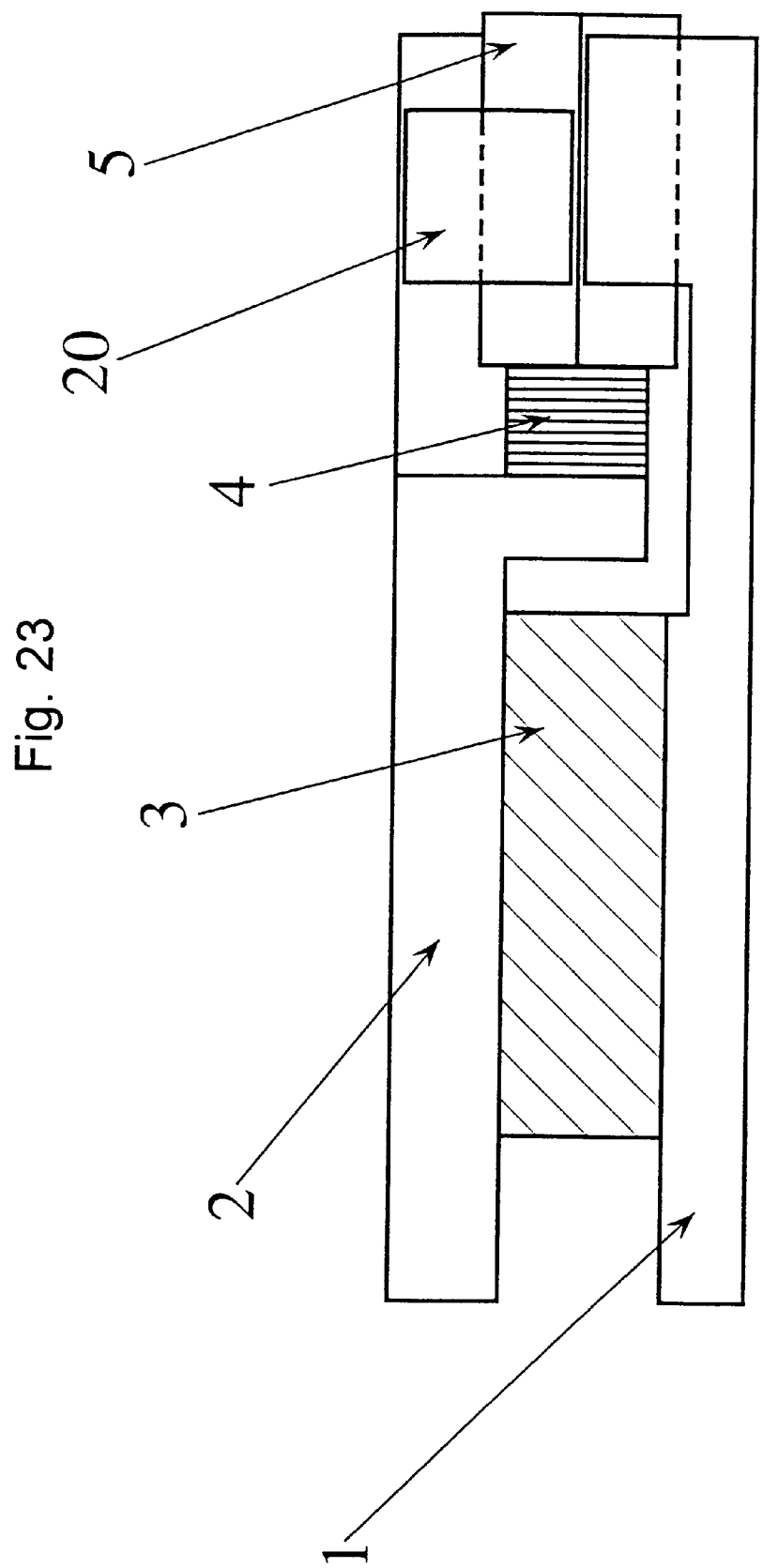
FIG. 23 A schematic side view of the positioner shown in FIG. 22.

FIGS. 22 and 23 show in plan and side view respectively a positioner according to a fourth embodiment of the invention. The positioner of the fourth embodiment comprises a base element in the form of a base plate 1 and a carriage in the form of a top plate 2 arranged on top of the base plate. The base and top plates 1 and 2 are generally square, having outer dimensions of 50 by 50 millimeters and 46 by 46 millimeters ("a") respectively and are made of aluminum. The base and top plates 1 and 2 have respective apertures of diameter "d" arranged centrally therein, where d=28 millimeters, to provide an access hole passing through the positioner. The aperture in the base plate 1 extends through a full arc to form a circular aperture, whereas the aperture in the top plate does not extends through a complete arc, but around approximately 330°, there being a cut away corner region of the top plate 2 formed by two terminal sides of the top plate which extend at right angles to each other from respective outer sides of the top plate to respective ends of the periphery of the arcuate aperture formed in the top plate. One of the terminal sides of the cut-away corner region extends downwards below the plane of the top plate 2 to form a flange having an abutment face for receiving one of the end faces of a piezoelectric element 4. The piezoelectric element is a piezoelectric stack of approximately 4 millimeters in length and extending lengthways by 4 micrometers per 150 volts of applied voltage at room temperature.

The top and base plates 1 and 2 are slidably connected to each other via respective halves of two bearing assemblies 3 in the form of ball slides which extend along an opposing pair of sides of the plates so as not to obscure the access hole and in a slightly staggered configuration. Each ball slide is a preassembled unit of dimensions 19.05 by 9.65 millimeters in the plane of the plates and 5.84 millimeters perpendicular to the plane of the plates, has a travel of 12.7 millimeters and a specified load bearing capacity of 680 grammes. The preassembled units have threaded bores via which their respective sliding halves are secured via screw fasteners to the base and top plates. The corner region of the base plate 1 lying below the cut-away corner region of the top plate 2, when considered in plan view (i.e. with reference to FIG. 22), has in the upper face thereof a V-groove for receiving two adjacent sides of a square section rod 5, one end face of which is bonded to the other of the end faces of the piezoelectric element 4 to form a drive train with the rod 5 and piezoelectric element 4 extending in series, as in the previous embodiments. The rod 5 has a cross-section of 5 by 5 millimeters and a length of 12 millimeters.

A collar 20 has a V-groove for receiving the other two sides of the square section rod 5 and two counterbore holes 19, one on each side of the V-groove, for receiving a pair of screws (not shown) biased by respective compression springs (not shown) to define the magnitude of the frictional force F between the base and top plates 1 and 2 in the same way as the arrangement described with reference to FIGS. 2A and 2B. The frictional force F is typically set, by adjusting the bias, to have a value of between 1 and 10 newtons, although forces of greater than 10 newtons can be set if desired.

The thickness of the positioner of the fourth embodiment is approximately 15 millimeters, giving overall dimensions of 50 by 50 by 15 millimeters for a single axis positioner, or 50 by 50 by 30 millimeters for a twin axis positioner comprising two single axis positioners stacked on top of one another to provide mutually perpendicular axes of movement.

The positioner of the fourth embodiment is suitable for use at room temperature as a positioner in a conventional microscope for positioning a microscope slide or the like under an objective lens. Two such positioners are stacked on top of one another to provide the desired xy-positioning capability. The large access hole can accomodate a microscope objective lens of 23 millimeters in diameter and still allow several millimeters of travel in the x and y directions. Such an xy-positioner may also be used in near-field optics as a so-called coarse positioner, or even as a combined coarse and fine positioner, fine positioning being achievable by ensuring that the double differential of the temporal evolution of the drive voltage applied to the piezoelectric element 4 is sufficiently small so as not to induce slippage between the rod 5 and the collar 20.

Figure 24:
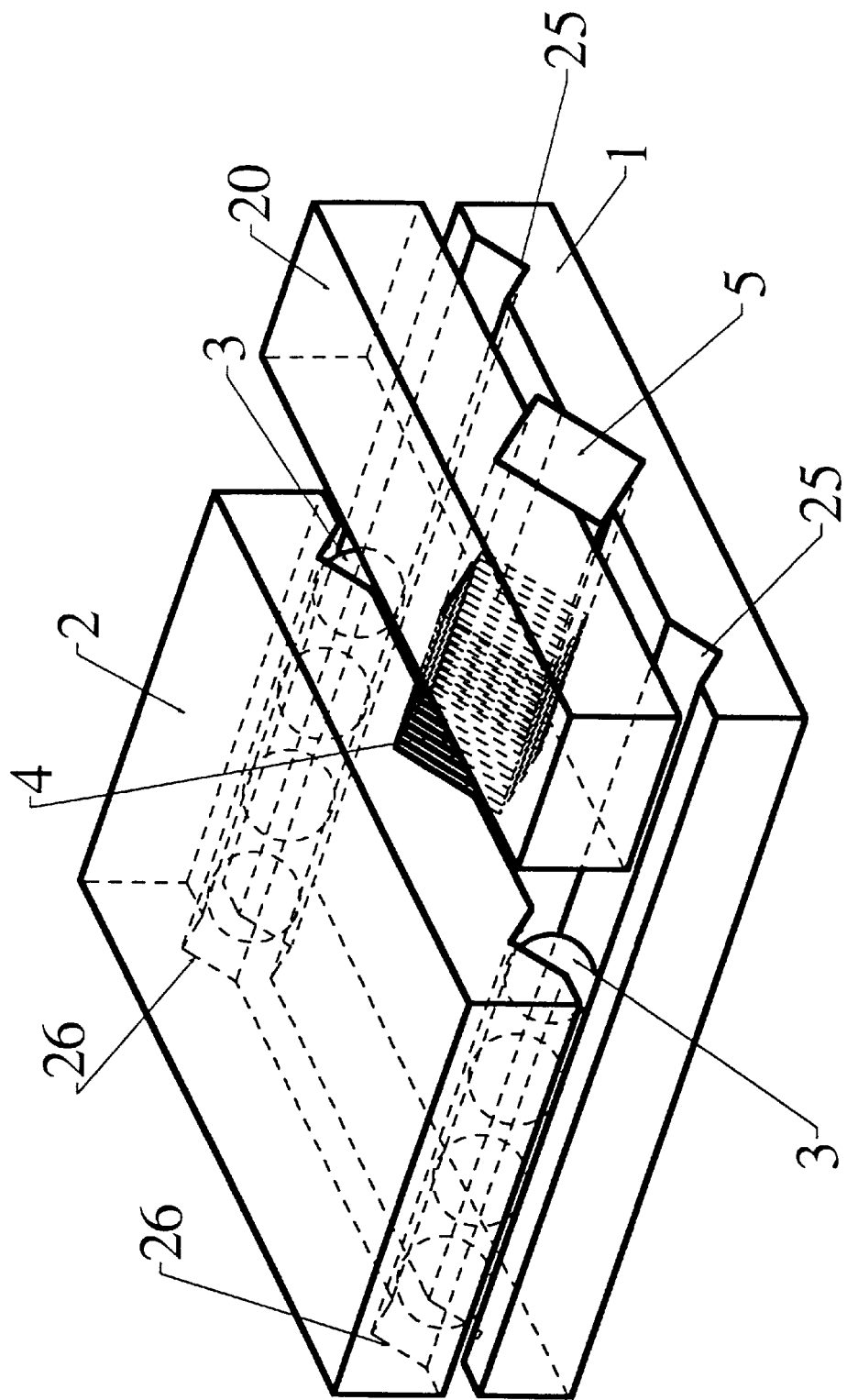
FIG. 24 A schematic perspective view of a positioner according to a fifth embodiment of the invention.

FIG. 24 is a perspective view of a positioner according to a fifth embodiment of the invention. The positioner of the fifth embodiment comprises a base element in the form of a square base plate 1, on top of which are arranged a carriage in the form of a rectangular top plate 2 and a rectangular collar 20, the lengths of the respective major sides of the top plate 2 and collar 20 being approximately eqaul to the side length of the base plate 1.

The base plate 1 has on its upper side a pair of V-grooves 25 extending parallel to each other along the full length of respective opposite sides of the base plate. The top plate 2 has on its lower side a corresponding pair of V-grooves 26 arranged to face the V-grooves 25 of the base plate 1 and extending along the full length of respective minor sides of the top plate 2, the minor side length of the top plate 2 being approximately two-thirds of the side length of the base plate 1. The top and base plates 1 and 2 are slidably engaged by two sets of ball bearings 3 seated in the V-grooves 25 and 26, the ball bearings 3 being caged in a sheet-like cage (not shown).

The collar 20 has in its lower side a V-groove extending along its full minor side length parallel to the V-grooves 25 and 26 and arranged midway along the major side of the collar 20. There is a corresponding V-groove in the upper side of the base plate arranged to face the collar V-groove.

A rod 5 of square section is seated in the collar V-groove and corresponding base plate V-groove to provide frictional engagement in the manner described further above in connection with the previous embodiments. The magnitude of the frictional force F between the collar 20 (and thus the base plate 1) and top plate 2 is set in the same way as in the arrangement described with reference to FIGS. 2A and 2B, namely there are two counterbore holes (not shown) arranged between the central V-groove pair for the rod 5 and the two lateral V-groove pairs 25 and 26, a pair of screws (not shown) biased by respective compression springs (not shown) being arranged in the counterbore holes.

The interior terminating face of the rod 5 is bonded to an end face of a square section piezoelectric stack 4, forming the piezoelectric element, the other end face of the piezoelectric stack 4 being bonded to a face on the interior major side of the top plate 2, as will be understood with reference to the previous embodiments.

In an example of the fifth embodiment, the base plate has dimensions 30×30×6 mm, the top plate 30×15×6 mm and the collar 30×10×6 mm. The ball bearings have a diameter of 3 millimeters. The rod is 4×4 mm in section and 15.5 mm in length. The piezoelectric element is 4×4 mm in section and 5 mm in length.

The positioner of the fifth embodiment can be made to be operable at low temperatures (e.g. liquid Nitrogen or Helium temperatures) and in high magnetic fields (e.g. 1 to 10 Tesla). In an example of a low temperature and high magnetic field compatible positioner of the fifth embodiment: the base plate 1, top plate 2, collar 20, rod 5 and fasteners are made of titanium; the ball bearings are made of ruby; and the cages are made of plastic. The ball bearings could alternatively be made of sapphire, glass or ceramic. The cages could alternatively be made of non-magnetic metal sheet. In a low cost system, an alternative material to titanium is brass.

What I claim is:

1. An inertial positioner, comprising:
    a rod (5) arranged upstanding in the positioner and having a principal axis, upper and lower end faces extending in respective planes substantially perpendicular to said principal axis, and a first and a second side surface portion extending substantially parallel to said principal axis;
    a base member arranged to contact said first side surface portion of the rod;
    a pressing member (20) arranged to contact said second side surface portion of the rod and to press against said second side surface portion of the rod to define a frictional force between the pressing member and the base member;
    a piezoelectric element (4) arranged upstanding in the positioner and having a principal axis, and upper and lower end faces extending in respective planes substantially perpendicular to said principal axis of the piezoelectric element, said lower end face of the piezoelectric element being rigidly secured to the upper end face of the rod; and
    a carriage member (2) having a mass and a lower surface portion, the lower surface portion being rigidly secured to the upper end face of the piezoelectric element so that said mass acts on the rod via the piezoelectric element.

2. The inertial positioner of claim 1, the piezoelectric element comprising a piezoelectric stack.

3. The inertial positioner of claim 2, the piezoelectric stack having a cross-sectional area of greater than at least one of the group consisting of: 10, 20, 30, 50 and 75 square millimeters.

4. The inertial positioner of claim 1, the rod having a polygonal cross-section.

5. The inertial positioner of claim 4, the polygonal cross-section comprises one of the group consisting of square cross-section, rectangular cross-section, and triangular cross-section.

6. The inertial positioner of claim 1, the piezoelectric element comprising a piezoelectric tube.

7. The inertial positioner of claim 6, the piezoelectric tube having an outside diameter of greater than or equal to at least one of the group consisting of: 4, 6, 8 and 10 millimeters.

8. The inertial positioner of claim 1, the rod having a cross-sectional area of greater than at least one of the group consisting of: 3, 10, 20, 30, 50 and 75 square millimeters.

9. The inertial positioner of claim 1, comprising a bearing assembly (3) arranged to slidably connect the base member and the carriage member to one another.

10. The inertial positioner of claim 1, comprising an adjuster (21, 22) for adjusting said frictional force applied by the pressing member (20).

11. The inertial positioner of claim 10, the adjuster comprising a spring (21) for applying the frictional force and a threaded element (22) for adjusting the frictional force applied by the spring.

12. An inertial positioner, comprising:
- a base plate having an upper surface, a lower surface and at least one external side surface interconnecting the upper and lower surfaces;
- a top plate (2) having an upper surface, a lower surface and at least one external side surface interconnecting the upper and lower surfaces of the top plate;
- a bearing assembly (3) arranged sandwiched between the base plate and the top plate to slidably connect the upper surface of the base plate to the lower surface of the top plate so as to allow motion of the top plate in a positioning direction;
- a piezoelectric element (4) having a principal axis extending substantially parallel to the positioning direction, and first and second end faces extending in respective planes substantially perpendicular to said principal axis, said first end face of the piezoelectric element being rigidly secured to a portion of said at least one external side surface of the top plate;
- a rod (5) having a principal axis extending substantially parallel to the positioning direction, first and second end faces extending in respective planes substantially perpendicular to said principal axis, and an upper and a lower side surface portion extending substantially parallel to said principal axis of the rod, said first end face of the rod being rigidly secured to said second end face of the piezoelectric element and said lower side surface portion of the rod lying on a surface portion of the upper surface of the base plate; and
- a pressing member (20) arranged above and secured to the base plate and having a lower surface portion arranged pressed against said upper side surface portion of the rod to define a frictional force for movement of the rod along the principal axis of the rod in between the pressing member and the base plate.

13. The positioner of claim 12, the base plate having an internal side surface interconnecting the upper surface and the lower surface of the base plate and extending to define a hole through the base plate, and the top plate having an internal side surface interconnecting the upper surface and the lower surface of the base plate and extending to define a hole through the top plate, the respective internal side surfaces being arranged so as to provide for access through the positioner.

14. The inertial positioner of claim 12, comprising an adjuster (21, 22) for adjusting said frictional force (F) applied by the rod pressing member (20).

* * * * *